United States Patent [19]

Klotz

[11] Patent Number: 5,294,332

[45] Date of Patent: Mar. 15, 1994

[54] FCC CATALYST AND PROCESS

[75] Inventor: Marvin R. Klotz, Batavia, Ill.

[73] Assignee: Amoco Corporation, Chicago, Ill.

[21] Appl. No.: 980,388

[22] Filed: Nov. 23, 1992

[51] Int. Cl.$^5$ .................. C10G 11/05; B01J 29/06
[52] U.S. Cl. ................... 208/120; 208/119; 208/113; 208/121; 208/122; 502/63; 502/73
[58] Field of Search .................. 208/120, 119, 46, 87, 208/112, 135, 108, 118, 113; 502/62, 64, 65, 67, 68, 78, 65, 78, 63, 73; 589/700, 520

[56] References Cited

U.S. PATENT DOCUMENTS 4,377,502  3/1983  Klotz ................................. 502/78
5,098,684  3/1992  Kresge et al. ..................... 502/65

OTHER PUBLICATIONS

Molecular Sieve Catalsts, p. 7, P. Michiels & O. C. E. De Herdt, EPO Applied Tech. Series, v. 9, The Hague, The Netherlands (1987).

Primary Examiner—R. Bruce Breneman
Assistant Examiner—Bekir L. Yildirim
Attorney, Agent, or Firm—Thomas A. Yassen; Richard A. Kretchmer

[57] ABSTRACT

A process and catalyst are provided for the catalytic cracking of a hydrocarbon feedstock to catalytic cracking conversion products comprising the steps of contacting the hydrocarbon feedstock at catalytic cracking conditions with a catalytic cracking catalyst. The catalytic cracking catalyst is prepared by modifying a base catalyst comprising a crystalline molecular sieve and a binder by combining the base catalyst with an ion exchange solution comprising at least one trivalent cation, a trivalent cation complexing agent, and a hydroxide-producing component, wherein the ion exchange solution has a pH ranging from about 4 to about 8, and producing an ion exchanged catalyst and excess ion exchange solution. The modified catalyst is then separated from said excess ion exchange solution.

20 Claims, No Drawings

FCC CATALYST AND PROCESS

BACKGROUND OF THE INVENTION

This invention relates to a catalyst and process for increasing the yield of iso-olefinic hydrocarbons in a fluid catalytic cracking unit (FCC). More particularly, this invention relates to a modified FCC catalyst and a process for using such a catalyst wherein the catalyst is modified by trivalent cation exchange with an ion exchange solution comprising a trivalent cation, a trivalent cation complexing agent, and a hydroxide-producing component. Increased yields of FCC unit olefinic hydrocarbons are particularly useful for the production of oxygenated gasoline blending components.

Oxygenates have been part of the United States gasoline strategy since the late 1970s. With the Clean Air Act Amendments of 1990, the demand for oxygenates is expected to increase even further. For example, starting in the winter months of 1992, gasoline containing 2.7 weight percent oxygen will have to be provided to approximately 40 metropolitan areas that have failed to meet carbon monoxide pollution standards. It is expected that in the near future, between 30 and 60 percent of the United States gasoline pool may be required to contain oxygenates. Current oxygenate production capacity is insufficient for meeting these requirements.

The most commonly used oxygenates today are methanol, ethanol, and methyl tertiary butyl ether (MTBE). Although methanol and ethanol have high blending octanes, problems with toxicity, water miscibility, high Reid Vapor Pressure (RVP), high nitrogen oxide emissions, lower fuel efficiency, and cost have dampened industry enthusiasm for these components. Partially as a result of the above, MTBE has become particularly attractive.

Homologues of MTBE such as ethyl tertiary butyl ether (ETBE) and methyl tertiary amyl ether (TAME) are also gaining industry acceptance. Moreover, commercial activity with respect to ETBE and TAME is expected to increase relative to MTBE, in view of the recent Environmental Protection Agency decision to reduce the RVP requirements for gasolines well below 9 psia, the blending RVP of MTBE.

Oxygenate production in the United States is generally limited by oxygenate plant capacity and by feedstock availability. MTBE and ETBE both utilize isobutylene as a feedstock while TAME utilizes isoamylene as a feedstock. Isobutylene and isoamylene are generally supplied to petroleum refinery MTBE, ETBE, and TAME facilities from fluid catalytic cracking units, fluidized or delayed cokers, and/or from downstream paraffin dehydrogenation and isomerization facilities. The availability of hydrocarbons having 4 or 5 carbon atoms is generally limited by constraints such as, but not limited to, crude properties, commercial FCC catalyst properties, FCC operating conditions, and coking conditions, etc. The chemical mix of $C_4$ and $C_5$ paraffins, olefins, and aromatics as well as the particular mix of iso-olefins to normal olefins are similarly constrained.

It has now been found that another method exists to favorably affect the yield of olefins and iso-olefins for use in such oxygenate producing processes. FCC catalysts comprising crystalline molecular sieves can be modified either during or after production of the catalyst off-site, or on-site at a fluid catalytic cracking facility, in order to favorably increase the yields of olefins and, in particular, iso-olefins having 4 and 5 carbon atoms.

Crystalline molecular sieves commonly utilized in fluid catalytic cracking catalysts have distinct crystal structures which are demonstrated by X-ray diffraction. The crystal structure defines cavities and pores which are characteristic of the different species. The adsorptive and catalytic properties of each molecular sieve are determined in part by the dimensions of its pores and cavities. Thus the utility of a particular molecular sieve as a fluid catalytic cracking catalyst depends at least partly on its crystal structure. Although many different molecular sieves have been disclosed in the prior art for use in cracking catalysts, there continues to be a need for still more effective molecular sieves and methods for making and modifying such sieves. This is particularly true since the product needs of the refiner continue to change due to unpredictable and quickly evolving events such as, for example, unforeseen nor predictable environmental regulation.

Synthetic molecular sieves are often prepared from mixtures containing alkali metal hydroxides and therefore, can have alkali metal contents of 1 percent by weight or more. The ion exchange of various metals or ammonium ion for such alkali metals is generally performed in catalysis in order to obtain active sites that will facilitate particular catalytic reactions. For example, ion exchange of other metal cations or ammonium ion for such alkali metals can be performed to modify catalyst acidity subject to the particular reactions desired and the feedstock and operating condition constraints inherent to the process for conducting these reactions. In other cases, ion exchange of other metal cations or ammonium ion for such alkali metals can be performed to obtain a particular type of activity or selectivity conducive to catalyzing a particular type or degree of reaction. Typical exchangeable alkali metals in the sieve include sodium or potassium and such an ion exchange can be performed with components such as ammonium nitrate or acetate, followed by a subsequent heating step for releasing ammonia, wherein a proton remains at the exchangeable site. This type of ion exchange generally leaves the molecular sieve in the "hydrogen form."

For purposes of the present invention, the term "ion exchange" shall mean the method of changing one cation for another cation at the ion exchangeable sites in the pores of the molecular sieve. This term does not refer to the elemental replacement of one framework element by another potential framework element. Framework elements are generally those elements that are tetrahedrally bonded through oxygen to each other for providing the typical molecular sieve framework.

Similarly, the term "ion exchangeable sites" shall means the site(s) in a molecular sieve occupied by the cation that balances the negative charge of the electron rich framework tetrahedra.

Metal cation ion exchanges such as aluminum ion exchange can also be performed and generally involve the addition of a molecular sieve to an ion exchange solution comprising a metal salt such as aluminum nitrate and water as exemplified by the following example:

Below a pH of about 4

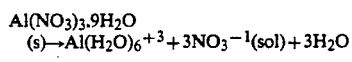

$$Al(H_2O)_6^{+3} \rightarrow Al(OH)(H_2O)_5^{+2} + H^+$$

$$NaMS(s) + Al^{+3}(sol) \rightarrow Al\ MS\ (s) + 3Na^{+1}(sol)$$

where MS is a molecular sieve, Na and Al are the sodium and aluminum ions respectively, and where (s) and (sol) designate the solid species and species dissolved in solution respectively.

Trivalent cation ion exchange can be particularly beneficial, compared to divalent and monovalent cation ion exchange, due to advantages in molecular sieve stability and enhanced activity and selectively.

However, it is generally known in the prior art that trivalent cation ion exchanges with aluminum can be very difficult to effect. See Carvajal, Chu, and Lunsford, The Role of Polyvalent Cations in Developing Strong Acidity: A Study of Lanthanum-Exchanged Zeolites, Journal of Catalysis 125, 123–131 (1990). In Dealumination of Large Crystals of Zeolite ZSM-5 by Various Methods by Kornatowski, Rozwadowski, Schmitz, and Cichowlas, J. Chem. Soc., Faraday Trans., 88(9), 1339–43, it is noted that ion exchange of ZSM-5 with $Al^{+3}$ by using aqueous solutions of Al salts is impossible. The salts of metallic cations, and particularly the trivalent cations such as aluminum, generally form acidic solutions when dissolved in water. For example, the pH of aluminum nitrate generally ranges from about 1 to about 3. Maintaining a low trivalent cation ion exchange solution pH is generally necessary to keep the aluminum in solution. Where the pH of the ion exchange solution comprising an aluminum trivalent cation is increased beyond a level of about 4, the lower solution acidity creates a competition between the aluminum ion exchange reaction and hydroxide ion wherein the aluminum cation can form the colloidal hydroxide and precipitate from the ion exchange solution according to the following reactions:

Above a pH of about 4

$$Al(NO_3)_3 \cdot 9H_2O(s) \rightarrow Al(H_2O)_6^{+3} + 3NO_3^{-1}(sol) + 3H_2O$$

$$Al(H_2O)_6^{+3} \rightarrow Al(OH)_3(s) + 3H_2O + 3H^+$$

It is generally the formation of the aluminum hydroxide precipitate that will not allow aluminum ion exchange to occur above a pH of about 4. Therefore, practicality has historically dictated that such molecular sieve ion exchanges using trivalent cations be conducted at a pH of below 4.

However, molecular sieve ion exchange using ion exchange solutions having a pH of less than 4 can cause the framework aluminum of a zeolite to be acidically leached from the silicon framework. For non-zeolitic molecular sieves such as a borosilicate or a gallosilicate, the framework boron or gallium can similarly be acidically leached from the silicon framework. Since this leaching effect generally reduces the number of exchangeable sites in the molecular sieve, the level of possible trivalent cation ion exchange is also reduced. This leaching effect generally results in a less acidic sieve and can be undesirable to the fluid catalytic cracking catalyst manufacturer or fluid catalytic cracking process operator. Moreover, with some zeolites, a pH of less than 4 can cause the general collapse of the framework and result in an amorphous material.

Therefore, there is a great need in fluid catalytic cracking and catalysis in general, for a method for trivalent cation ion exchange of fluid catalytic cracking catalysts comprising at least one molecular sieve that avoids the problems inherent to the methods of the prior art and does not acidically leach framework metals from the molecular sieve.

Conventional methods for the ion exchange of molecular sieves, and in particular, the zeolites are disclosed in Zeolite Molecular Sieves, Donald W. Breck, John Wiley & Sons at pages 529–580 (1974).

Ion-exchange of cations into zeolite, and particularly the Y zeolite, has also been studied extensively, including work by H. S. Sherry in J. Phys. Chem. (1968) 72, 4086 and in Advan. Chem. Ser. (1971) 101, 350.

Lactic acid has been used in catalysis for templating zeolite synthesis. For example, U.S. Pat. No. 4,511,547 to Iwayama et al. and U.S. Pat. No. 4,581,216 to Iwayama et al. disclose the use of lactic acid for the formation of zeolites where the cation-lactate is a space-filling material around which the zeolite is crystallized. The lactic acid in the Iwayama et al. references is provided for templating the zeolite during formation and is not used for zeolite modification or for the ion exchange of the zeolite subsequent to formation.

Enhancing the activity of a zeolite through low temperature steaming has been disclosed for limited uses. For Example, U.S. Pat. No. 4,784,747 to Shihabi discloses a catalytic hydrodewaxing process utilizing a catalyst comprising an aluminosilicate crystalline zeolite having a silica to alumina ratio of at least 250:1 and a Constraint Index from 1 to 12 and an alumina binder. The catalyst is subsequently steamed by heating for at least one hour in the presence of water at a temperature from about 300° C. to 500° C. such that the pressure during steaming ranges from about 100 to 500 kPa.

It has now been found that trivalent cation ion exchange of fluid catalytic cracking catalysts comprising one or more molecular sieves can be performed while minimizing the adverse effects of framework metal leaching by complexing the trivalent cation in a manner so as to keep it from precipitating from the ion exchange solution when the pH of the solution is increased.

It has also been found that increasing the pH of the ion exchange solution to a level ranging from about 4 to about 8, as provided for in the present invention, results in effective ion exchange while substantially minimizing leaching of the framework metal and the reduction in ion exchangeable sites caused by such leaching.

It has also been found that when using the particular complexing solution of the present invention comprising one or more of the alpha, beta, and gamma hydroxy- and amino-carboxylic acids and some crown ethers as exemplified by lactic acid, tartaric acid, glycine, and 15-crown-5, and equivalents thereof, the complexed trivalent cation can generally continue to enter the pores of the molecular sieve and gain access to the exchangeable sites.

It has also been found that when using the particular complexing solution of the present invention comprising one or more of the alpha, beta, and gamma hydroxy- and amino-carboxylic acids and some crown ethers as exemplified by lactic acid, tartaric acid, glycine, and 15-crown-5, and equivalents thereof, the complexed trivalent cation can be effectively released to the molecular sieve exchangeable sites of the fluid catalytic cracking catalyst.

It has also been found that when a fluid catalytic cracking catalyst is modified utilizing the method of the present invention, the yield of iso-olefins, and particularly iso-olefins having 4 and 5 carbon atoms, can be increased compared to identical fluid catalytic cracking catalysts that are not so modified.

It is therefore an object of the present invention to provide a catalyst and process for fluid catalytic cracking comprising the effective trivalent cation ion exchange of fluid catalytic cracking catalysts comprising molecular sieves.

It is another object of the present invention to provide a catalyst and process for fluid catalytic cracking comprising the effective trivalent cation ion exchange of fluid catalytic cracking catalysts comprising molecular sieves at a pH above 4.

It is another object of the present invention to provide a catalyst and process for fluid catalytic cracking comprising the trivalent cation ion exchange of fluid catalytic cracking catalysts comprising molecular sieves which reduces the level of acidic leaching of framework metals and permits the molecular sieve to retain its integrity and maintain its cracking activity compared to prior art processes.

It is yet another object of the present invention to provide a catalyst and process for fluid catalytic cracking comprising the trivalent cation ion exchange of fluid catalytic cracking catalysts comprising molecular sieves which increases the yield of iso-olefins produced in a fluid catalytic cracking process compared to prior art catalysts and processes.

Other objects appear herein.

SUMMARY OF THE INVENTION

The above objects can be achieved by providing a process for the catalytic cracking of a hydrocarbon feedstock to catalytic cracking conversion products comprising the steps of contacting the hydrocarbon feedstock at catalytic cracking conditions with a catalytic cracking catalyst. The catalytic cracking catalyst is prepared by modifying a base catalyst comprising a crystalline molecular sieve and a binder by combining the base catalyst with an ion exchange solution comprising at least one trivalent cation, a trivalent cation complexing agent, and a hydroxide-producing component, wherein the ion exchange solution has a pH ranging from about 4 to about 8, and producing an ion exchanged catalyst and excess ion exchange solution. The modified catalyst is then separated from the excess ion exchange solution.

In another embodiment, the above objects can be achieved by providing a catalytic cracking catalyst comprising a crystalline molecular sieve and a binder wherein the catalyst has been modified by nondestructive trivalent cation ion exchange. The nondestructive trivalent cation ion exchange comprises modifying a base catalyst comprising a crystalline molecular sieve and a binder by combining the base catalyst with an ion exchange solution comprising at least one trivalent cation, a trivalent cation complexing agent, and a hydroxide-producing component, wherein the ion exchange solution has a pH ranging from about 4 to about 8, and producing an ion exchanged catalyst and excess ion exchange solution. The modified catalyst is then separated from the excess ion exchange solution.

The process and catalyst of the present invention facilitates modification or ion exchange of any one or more of numerous fluid catalytic cracking catalysts comprising molecular sieves with any one or more of several trivalent cations. Wherein the trivalent cation is aluminum, the process of the present invention can achieve increases in the level of exchangeable site aluminum compared to prior art methods.

The process and catalyst of the present invention facilitates trivalent cation ion exchange of fluid catalytic cracking catalysts comprising molecular sieves at a pH above 4. Where prior art methods for trivalent cation exchange generally required a pH of less than 4, the process and catalyst of the present invention permits and utilizes a pH of greater than 4 and preferably from about 4 to about 8 in order to reduce framework metal leaching and increase catalyst activity and selectivity. The process of the present invention can reduce framework element losses by weight by more than 20 percent compared to prior art ion exchange methods.

The process and catalyst of the present invention provides for a fluid catalytic cracking process yielding iso-olefins having 4 and 5 carbon atoms at a level of more than 10 percent higher than comparable processes that do not utilize the inventive process and catalyst.

BRIEF DESCRIPTION OF THE INVENTION

The fluid catalytic cracking catalyst and process of the present invention can be utilized with substantially all fluid catalytic cracking catalysts comprising molecular sieves including the naturally-occurring and synthetic non-zeolitic molecular sieves such as gallosilicate and borosilicate and the naturally-occurring and synthetic zeolitic molecular sieves.

The zeolites are crystalline aluminosilicates that possess a cage-network structure with pores of a few angstroms in diameter. Some of the common materials, such as zeolite Y (faujasite) have a three dimensional structure with pore intersections ("supercages") generally larger than the pore size. Other zeolites such as zeolite L, have channels with diffusional cross connections. For each type of zeolite, a theoretical crystal structure or "framework" can be specified which is composed of interconnected silicon atoms, aluminum atoms, and oxygen atoms arranged in an ordered manner. The aluminum found within this zeolitic framework is referred to as "framework aluminum." A typical zeolitic framework comprises corner-sharing $SiO_4$ and $AlO_4$ tetrahedra. Charge deficiencies in the Si-O-Al framework are balanced by the presence of suitable positive ions such as ions of hydrogen, ammonium, alkali metal, alkaline earth metal, and rare earth metal.

Essentially any crystalline aluminosilicate can be modified or processed in accordance with the present invention. The zeolites can include both synthetic and naturally occurring zeolites. Illustrative of the synthetic zeolites are Zeolite X, U.S. Pat. No. 2,882,244; Zeolite Y, U.S. Pat. No. 3,130,007; Zeolite A, U.S. Pat. No. 2,882,244; Zeolite L, Bel. 575,117; Zeolite D, Can. 611,981; Zeolite R, U.S. Pat. No. 3,030,181; Zeolite S, U.S. Pat. No. 3,054,657; Zeolite T, U.S. Pat. No. 2,950,952; Zeolite Z, Can. 614,995; Zeolite E, Can. 636,931; Zeolite F, U.S. Pat. No. 2,995,358; Zeolite O, U.S. Pat. No. 3,140,252; Zeolite W, U.S. Pat. No. 3,008,803; Zeolite Q, U.S. Pat. No. 2,991,151; Zeolite M, U.S. Pat. No. 2,995,423; Zeolite H, U.S. Pat. No. 3,010,789; Zeolite J, U.S. Pat. No. 3,001,869; Zeolite W, U.S. Pat. No. 3,012,853; Zeolite KG, U.S. Pat. No. 3,056,654; Zeolite SL, Dutch 6,710,729; Zeolite Omega, Can. 817,915; Zeolite U.S. Pat. No. ZK-5, 3,247,195; Zeolite Rho, Proc. Sixth Intern. Zeolite Conf., Olson and Bisio, Eds., 812–822, 1983; Zeolite Beta, U.S. Pat. No. 3,308,069; Zeolite ZK-4, U.S. Pat. No. 3,314,752; Zeolite ZSM-5, U.S. Pat. No. 3,702,886; Synthetic Mordenite; Ultrastable Zeolites, U.S. Pat. Nos. 3,293,192 and 3,449,070; and the references cited therein. Other synthetic zeolites are described in the book "Zeolite Molecular Sieves-Structure, Chemistry, and Use," by Donald W. Breck, 1974, John Wiley & Sons, which is hereby incorporated by reference.

Illustrative of naturally occurring crystalline zeolites are analcime, bikitaite, edingtonite, epistilbite, levynite, dachiardite, erionite, faujasite, analcite, paulingite, noselite, ferrierite, heulandite, scolecite, stilbite, clinoptilolite, harmotone, phillipsite, brewsterite, flakite, datolite, chabazite, gmelinite, cancrinite, leucite, lazurite, scolecite, mesolite, ptilolite, mordenite, nepheline, natrolite, scapolite, thomsonite, gismondine, garronite, gonnardite, merlinolite, laumontite, offretite, and yugawaralite. Descriptions of illustrative naturally occuring zeolites are found in the aforementioned book by Breck and in the book "Molecular Sieves-Principles of Synthesis and Identification," R. Szostak, Van Nostrand Reinhold, New York, 1989, hereby incorporated by reference, and in other known references.

Nonzeolitic molecular sieves, which can also be referred to as nonaluminosilicate molecular sieves, metallosilicates, or zeotypes, are also suitable for use with the method of the present invention. These molecular sieves are generally synthesized to contain metallic components in place of some or all of the aluminum and/or silicon atoms. Typical metallic components include, but are not limited to boron, gallium, phosphorus, titanium, iron, cobalt, manganese, magnesium, and zinc. These nonzeolitic molecular sieves are of the zeolite structure types included in, but not limited to those found in "Atlas of Zeolite Structure Types," W. M. Meier and D. H. Olson, 1992, Butterworth-Heinemann, Boston, which is hereby incorporated by reference.

While substantially most, if not all fluid catalytic cracking catalysts comprising molecular sieves are suitable for use with the method of the present invention, the preferred fluid catalytic cracking catalysts comprise synthetic zeolite, borosilicate, and gallosilicate molecular sieves, and more preferably, faujasite, zeolite beta, ZSM-5, and borosilicate molecular sieves.

It has also been found that combining catalyst comprising molecular sieves that have been treated in accordance with the process of the present invention, can provide synergistically favorable performance. For example, the use of a first catalyst comprising a faujasite, zeolite Y, and/or US-Y molecular sieve combined with a second catalyst comprising a pentasil molecular sieve such as ZSM-5 and/or borosilicate, wherein both first and second catalysts have been modified in accordance with the present invention, can provide superior yields of isobutylene, isoamylene, and gasoline boiling at a temperature of below 430° F. at atmospheric pressure, relative to the by-product yield of light hydrocarbons such as propylene. These yield benefits surprisingly, unexpectedly, and synergistically exceed the yields projected from identical combinations of the two catalyst groups wherein only one or the other catalyst is modified. Unmodified combinations of catalysts such as described above can result in substantial overcracking of gasoline boiling hydrocarbon to light hydrocarbon such as propylene in order to obtain the high levels of isobutylene and isoamylene desired for oxygenate manufacture.

The molecular sieves to be processed in accordance with the method of the present invention can generally contain as much as 1 percent by weight or more of one or more alkali metals. The most commonly encountered alkali metals in natural occurring and synthetic molecular sieves are sodium and potassium. It is the alkali metals described above that define the exchangeable sites and that are generally replaced utilizing the trivalent cation ion exchange method of the present invention. The extent of ion exchange to be performed is generally a function of the particular reactions desired in the catalytic cracking process and the feedstock and operating condition constraints inherent to the process for conducting these reactions.

The ion exchange method for modifying a fluid catalytic cracking catalyst comprising at least one molecular sieve utilizes an ion exchange solution comprising a trivalent cation, a trivalent cation complexing agent, and a hydroxide-producing component.

The trivalent cation is generally present with a suitable anion in the form of a trivalent metallic compound or salt. The trivalent cation can comprise any cations having a +3 valence state, including, but not limited to aluminum, gallium, indium, thallium (III), iron (III), chromium (III), scandium, yttrium, cerium (III), lanthanum, praseodymium (III), neodymium (III), samarium, europium (III), gadolinium, terbium, dysprosium, holmium, erbium, thullium, ytterbium, and lutetium. The preferred trivalent cations are aluminum, gallium, iron (III), chromium (III), and the rare earth metals, with aluminum being most preferred.

It is important to note that identification of the level and extent of trivalent cation exchanged to the exchangeable site can be difficult to determine where the trivalent cation is the same metal present in the framework of one or more of the molecular sieves present in the fluid catalytic cracking catalyst. For example, exchanging aluminum to the exchangeable site of a zeolite having framework aluminum can be difficult to monitor. When aluminum ion exchange is performed, some of the aluminum already present in the molecular sieve framework generally remains in the framework of the zeolite, some aluminum is removed from the framework of the zeolite, and some aluminum is exchanged from the ion exchange solution to the ion exchangeable sites. Under such circumstances, determining the contributions of each effect and particularly the origin of additional framework aluminum can be difficult. The mechanisms of the method of the present invention can best be observed and confirmed by ion-exchanging a first trivalent cation to the exchangeable sites on a molecular sieve having a different framework metal. In this manner, the level of framework metal and ion exchanged cation in the bulk of the molecular sieve may be analyzed more effectively.

The anion of the trivalent cation can be any of several anions such as, but not limited to acetate, bromate, bromide, chlorate, chloride, nitrate, stearate, sulfate, oxide, and hydroxide. The preferred anions are generally acetate, bromide, chloride, fluoride, nitrate, and sulfate, with the nitrate anion being most preferred.

A particularly common and useful trivalent cation and anion composition is aqueous aluminum nitrate. Where aluminum nitrate is the source of the trivalent cation, the preferred molar concentration of the aluminum nitrate ranges from about 0.001M to about 10M, preferably from about 0.001M to about 4M, more preferably from about 0.01M to about 2M, and most preferably from about 0.03M to about 1.5M for best results. Lower concentrations of aluminum nitrate are generally less cost effective for use with the present invention while higher concentrations can present solubility complications.

The trivalent cation complexing agent can comprise the alpha, beta, and gamma hydroxy- and amino-carboxylic acids and some crown ethers, as exemplified by lactic acid, tartaric acid, glycine, and 15-crown-5. Suitable hydroxycarboxylic acids can include, but are not limited to 2-hydroxypropionic acid, 2-hydroxyacetic acid, 2-hydroxybutanoic acid, and 2-hydroxypentanoic acid. The preferred hydroxycarboxylic acid is 2-hydroxypropionic acid or lactic acid. Suitable amino acids can include, but are not limited to alpha amino acid, beta amino acid, and gamma amino acid. An example of an amino acid suitable for use in the process of the present invention is glycine.

The preferred trivalent cation complexing agent is generally a sufficiently strong complexing agent such that the complexed trivalent cation that is formed, does not disassociate easily. For example, a complexed trivalent cation comprising an aluminum trivalent cation and an acetate anion generally forms a hydroxide at a temperature of about 90° C. to about 100° C. at an ion exchange solution pH of about 6. The hydroxide generally binds itself to the exterior of the molecular sieve and does not permit the aluminum trivalent cation to reach the ion exchange site.

The preferred trivalent cation complexing agent is generally not too strong of a complexing agent such that the complexing agent does not release the trivalent cation into the molecular sieve. For example, a complexed trivalent cation comprising an aluminum trivalent cation with a complexing agent such as ethylenediaminetetraacetic acid (EDTA) is particularly stable and is generally too strong of a complexing agent to release the aluminum trivalent cation into the molecular sieve of the fluid catalytic cracking catalyst.

For the reasons described hereabove, it is preferred that the complexed trivalent cation have a complexing stability constant, as measured by the equilibrium molar concentration of the product of the complexing reaction (i.e., for example, reaction G below) divided by the molar concentration of the reactants of the complexing reaction, of from about 2 to about 15, preferably from about 5 to about 12, and more preferably from about 5.5 to about 9.0 for best results. Therefore, the preferred trivalent cation complexing agent should be selected with respect to the trivalent cation, in a manner so as to effect a complexed trivalent cation having a complexing stability constant within the range described above.

It is also important that the trivalent cation complexing agent be selected in a manner, with respect to the trivalent cation, to form a complexed trivalent cation that can physically and dimensionally enter the pores of the fluid catalytic cracking catalyst molecular sieves. For example, the complex formed from complexing the aluminum trivalent cation with ethylenediaminetetraacetic acid (EDTA) described above produces a complex that may be too bulky in size to enter the pores of many molecular sieves used with fluid catalytic cracking catalysts.

The hydroxide-producing component can include any of several hydroxide-producing components including, but not limited to ammonium hydroxide, tetraalkylammonium hydroxide, and the Group I hydroxides. The preferred hydroxide-producing component is an aqueous solution of ammonium hydroxide.

While not wishing to be bound to any particular theory, it is believed that the complexing reaction of the trivalent cation with the trivalent cation complexing agent takes place generally in one of two manners. For larger pore molecular sieves such as those having 12 or more membered rings and where aluminum is the trivalent cation and lactic acid is the trivalent cation complexing agent, the trivalent cation may be complexed and enters the pores of the molecular sieve in varying extents of the following reactions:

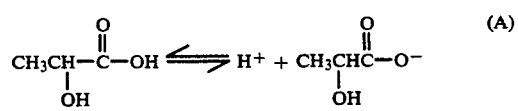

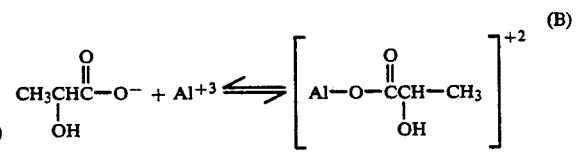

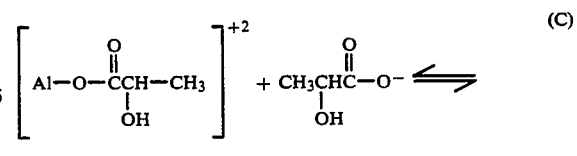

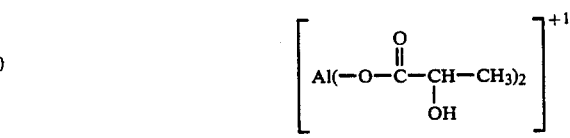

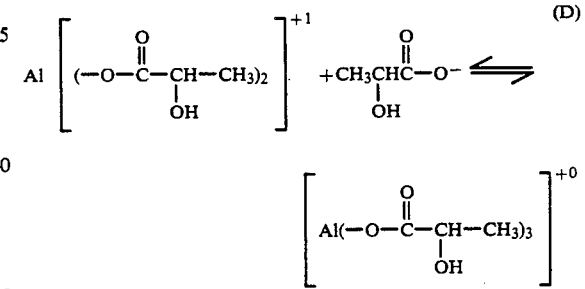

Reactions (B), (C), and (D) generally exist at an equilibrium concentration of each of the products of these reactions. The products of reactions (B), (C), and (D), for purposes of the present invention, are referred to as complexed trivalent cations.

For smaller pore molecular sieves such as those having 10 or less membered rings and where aluminum is the trivalent cation and lactic acid is the trivalent cation complexing agent, the trivalent cation may be complexing and entering the pores of the molecular sieve according to the following reactions:

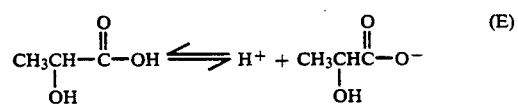

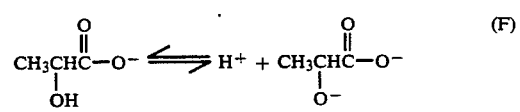

-continued

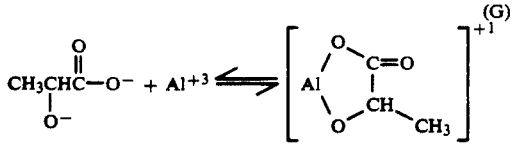

The product of reaction (G), for purposes of the present invention, is also referred to as a complexed trivalent cation. Equilibrium and Structural Studies of Silicon (IV) and Aluminum (III) in Aqueous Solution. 24. A Potentiometric and $^{27}$Al NMR Study of Polynuclear Aluminum (III) Hydroxo Complexes with Lactic Acid by Marklund and Ohman, Acta Chemica Scandinavica 44 (1990) pages 228-234, provides detailed teachings as to solubility and equilibrium constants for lactic acid systems and is hereby incorporated by reference.

Once the complexed trivalent cation has been formed, the complexed trivalent cations generally diffuse through the pores of the molecular sieve to the exchangeable cation site in the molecular sieve. It is important to note that the dianion lactate complex of the trivalent cations provides a complexed cation with a collective charge of +1 (Reaction G). This makes the complexed cation, aluminum, for example, appear to react with the exchangeable site in the same manner as a cation of Group I of the Periodic Table.

The ion exchange procedure, and particularly the final product analysis is simplified if the molecular sieve has been ion exchanged with the same cation hydroxide used subsequently to neutralize the exchange solution as shown below in reaction (H). In this case, the sodium form of the molecular sieve is ion exchanged with an ammonium cation containing salt as per the primary examples used hereabove.

Designating the product of reaction (G) as $[Al(H_{-1})L]^{+1}$, wherein $(H_{-1})L$ represents the double ionization of both ionizable protons from lactic acid which generally provide the dianion of lactic acid, the ion exchange reaction becomes:

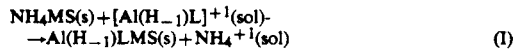

The expelled cation is generally from a weak base and will not appreciably change the pH of the ion exchange solution. Generally, one mole of aluminum (i.e., 1 complexed equivalent) is added to the sieve for each equivalent of exchangeable site. After calcination, there will generally appear to be as much as three equivalents of aluminum per exchangeable site.

The trivalent cation complexing agent is generally selected in a manner such that the trivalent cation complex is easily created from the trivalent cation and the trivalent cation complexing agent in the ion exchange solution.

Since the trivalent cation is generally complexed in the manner described hereabove, the fundamental problem in the art of forming the hydroxide of the trivalent cation is substantially reduced. Without the trivalent cation complexing agent, trivalent cations, and particularly aluminum, colloidally form hydroxides which can precipitate from the ion exchange solution. Aluminum hydroxide typically precipitates from ion exchange solutions at a pH of about 4 or above, cannot enter the pores of the molecular sieve, and undesirably coats the surface of the molecular sieve rendering the molecular sieve less effective for many chemical reactions desirable for profitable catalytic cracking.

Therefore, the trivalent cation complexing reaction permits ion exchange of the fluid catalytic cracking catalyst comprising at least one molecular sieve at conditions that are optimum for facilitating the desired catalytic reaction. Where it is desired to facilitate effective ion exchange while minimizing acid leaching of framework metals from the molecular sieve, the preferred ion exchange solution pH generally ranges from about 4.0 to about 8.0, preferably from about 4.5 to about 7.5, and more preferably from about 4.5 to about 7.0 for best results. The targeted ion exchange solution pH is generally obtained by the controlled addition of the hydroxide-producing component. Excessive ion exchange solution pH can result in the formation of aluminum hydroxide, notwithstanding the presence of the complexing agent, due to the relatively weak complexing agent strength.

It is also generally desirable to control the molar ratio of the trivalent cation complexing agent to the trivalent cation. Suitable trivalent cation complexing agent to trivalent cation molar ratios generally range from about 0.01 to about 50, preferably from about 0.04 to about 25, more preferably from about 0.1 to about 10, and most preferably from about 0.6 to about 6 for best results. Lower trivalent cation complexing agent to trivalent cation molar ratios can result in the trivalent cation precipitating out of solution. Higher molar ratios can result in the dissolution of some of the trivalent cation from the exchangeable sites and less effective ion exchange. Moreover, higher molar ratios can also result in failure of the trivalent cation complex to release the trivalent cation into the ion exchange site.

The ion exchange method utilized for the process and catalyst of the present invention can be performed by any of several methods known to those skilled in the art including methods disclosed in a wide variety of patents including U.S. Pat. Nos. 3,140,249, 3,140,251, and 3,140,253. Two particularly common techniques include aqueous ion exchange and impregnation.

The impregnation technique generally involves dissolving the trivalent cation in a suitable solvent, the trivalent cation complexing agent, and the hydroxide-producing component and impregnating this solution into the molecular sieve. The impregnation may be single or multiple. Incipient wetness techniques are generally preferred wherein just the amount of solution is utilized to just fill the pores of the molecular sieve. Suitable solvents can include water, alkanes, ketones, ethers, sulfoxides, and other solvents known to those skilled in the art. After impregnation, the molecular sieve is generally dried to remove the solvent. Mild calcination may also follow and is generally preferred.

The preferred ion exchange method is an aqueous ion exchange wherein the molecular sieve is contacted one or more times with a solution comprising the trivalent cation, the trivalent cation complexing agent, the hydroxide-producing component, and water. After ion exchange, the molecular sieve is dried to remove the solvent. Mild calcination may also follow and is generally preferred.

The ion exchange process conditions suitable for use with the process and catalyst of the present invention generally include an ion exchange temperature ranging from about 1° C. to about 165° C., preferably from about 10° C. to about 120° C., more preferably from about 25° C. to about 100° C., and most preferably from about 60° C. to about 100° C. for best results. Suitable ion exchange pressures generally range from about 1 atmosphere to about 10 atmospheres, preferably from about 1 atmosphere to about 4 atmospheres, and more preferably from about 1 atmosphere to about 2 atmospheres for best results. Suitable ion exchange times generally range from a time of about 0.1 hours to about 24 hours, preferably from about 0.5 hours to about 20 hours, more preferably from about 1 hour to about 16 hours, and most preferably from about 1 hour to about 10 hours for best results.

Where the ion exchanged fluid catalytic cracking catalyst molecular sieve is calcined, suitable calcination temperatures generally range from about 250° C. to about 750° C., preferably from about 425° C. to about 650° C., and more preferably from about 500° C. to about 600° C. for best results.

The modified catalyst in accordance with the process and catalyst of the present invention can also be steamed at catalyst steaming conditions. Such steaming steps can be performed to facilitate better dispersion of surface elements. Commonly, the catalyst is steamed prior to testing in order to expose the catalyst to conditions that may be experienced in an FCC regenerator, prior to evaluation of the catalyst.

Suitable catalyst steaming conditions generally comprise the use of saturated or superheated steam at a temperature ranging from about 800° F. to about 1600° F., preferably from about 1000° F. to about 1550° F., and more preferably from about 1200° F. to about 1500° F. for best results. It has been found that the use of steaming temperatures above these temperature ranges can result in catalyst sintering. Suitable steaming pressures generally range from about 0.7 atmospheres to about 12 atmospheres, preferably from about 0.9 atmospheres to about 6 atmospheres, and more preferably from about 1.0 atmosphere to about 4 atmospheres for best results. Steaming durations generally range from about 0.25 hours to about 48 hours, preferably from about 1.0 hour to about 24 hours, and more preferably from about 1.0 hour to about 10 hours for best results.

While not wishing to be bound to any particular theories, it is believed that several principles may contribute to the effectiveness of the catalytic cracking process of the present invention.

By way of background, it is generally known that catalyst matrices comprising any number of molecular sieves and inert inorganic oxides, can contribute to the activity of the catalyst for certain catalyzed reactions and the selectivity toward certain reaction products. The matrix contribution to activity and selectivity is generally due to the composition of the surface atoms of the catalyst. Generally, this contribution comes from a combination of elements on the catalyst surface that leave an element or a group of elements in a chemically unstable configuration. Moreover, these unstable and hence catalytically active sites can be repetitively generated using techniques known in the art of catalyst preparation.

Generally these groups of elements in chemically unstable configurations are also thermodynamically unstable such that they tend to react to provide an environment in which the thermodynamic instability is reduced. Where reduced stability occurs during the course of a catalytic reaction, catalyst activity can be compromised. Ordinarily, the solid state reaction of the catalyst is slow at reaction conditions such that the rate of catalyst change is not particularly significant. However, the rate of catalyst change increases substantially in environments of high catalyst temperature and high water vapor pressure.

Fluid catalytic cracking process regenerators can provide such an environment wherein catalyst particle temperatures can range as high as 1400° F. to 1500° F. and water vapor partial pressures can range as high as 0.03 to 0.05 (dimensionless). These are very severe conditions for catalysts and catalyst surface compositions and the catalyst characteristics can and do undergo significant changes. Therefore, a fresh catalyst generally has a different set of surface characteristics and composition than the average for an equilibrium catalyst or than for an average for the older particles in the catalyst mixture. The changes that occur are generally governed by thermodynamics although the governing thermodynamics are not completely understood.

The present invention relates to the trivalent cation ion exchange and modification of a catalyst by treating the catalyst with what would be known as an ion exchange solution. Where the ion exchange solution acts upon a finished total catalyst composite, the exchange occurs between the ion exchange solution and the molecular sieve as well as the other components within the catalyst matrix.

It has been found that a different set of thermodynamics generally govern the reaction between the ion exchange solution and a total catalyst composite. Since trivalent cations and ammonium cations are often the principle cations, most cationic reactions involve these two groups of cations. It is believed that the process of the present invention facilitates several phenomena that may contribute, in whole or in part, to the overall effectiveness of the method.

First, the ion exchange solution of the present process and the molecular sieve-containing catalyst can be buffered by an ammonium complex such as ammonium lactate. The ammonium ion can thereby remain in exchange equilibrium with numerous Group I, Group II, or Group III cations. In this manner, it is believed that a portion of these Group I, Group II, or Group III cations can be removed.

Secondly, it is believed that there is an interaction between the trivalent cation atoms, both complexed and uncomplexed, and the ion exchangeable sites on the catalyst matrix or molecular sieve. It is believed that these exchanges can result in additional trivalent cation at the exchangeable sites as well as serve to further reduce contaminant metal concentrations.

Thirdly, an interaction is believed to exist between the complexed anion (i.e., lactate anion), as a separate entity and as complexed, with various surface species. These various surface species can generally comprise iron as well as other contaminating metals. In general, the iron and other contaminating metals can be complexed with the complexed anion and remain in solution because of their low concentration. It is also believed that certain aluminum atoms can also be dissolved from the catalyst surface and proceed into solution.

It is also anticipated that redeposition of trivalent cation atoms back onto the catalyst surface can occur since the reactions that occur with the present process are generally equilibrium reactions. The redeposition of trivalent cations may or may not be at a site that aluminum or a contaminating metal was removed.

Since the surface of catalysts treated by the method of the present invention can be enriched in aluminum and/or trivalent cation, it is believed that catalyst activity and selectivity is further modified within a fluid catalytic cracking process regenerator from the severe temperatures and water vapor pressures. These conditions are generally known to cause the expulsion of framework metals and also from the pores of the molecular sieve. Moderate catalyst temperatures ranging from about 400° F. to about 1000° F. with a suitable water vapor pressure can also result in aluminum and/or trivalent cation migration across the catalyst surface. This migration may or may not include aluminum and/or trivalent cation migration toward the ion exchange sites in the molecular sieve.

It is believed that some or portions of all of the reactions described hereabove may contribute to the surprising and unexpected FCC product yields from use of the process of the present invention.

The fluid catalytic cracking process feedstock for use with the present process can comprise and one, several, or all refinery streams boiling in a temperature range of from about 150° F. to about 1300° F., preferably from about 430° F. to about 1200° F., and more preferably from about 550° F. to about 1200° F. at atmospheric pressure. The hydrocarbon fraction boiling at a temperature ranging from about 550° F. to about 1000° F. at atmospheric pressure is generally referred to as a gas oil boiling range component while the hydrocarbon fraction boiling at a temperature ranging from about 550° F. to about 1200° F. at atmospheric pressure is generally referred to as a full range gas oil/resid fraction or a long resid fraction.

Hydrocarbon fractions boiling at a temperature of below about 430° F. at atmospheric pressure can be alternatively and are generally more profitably recovered to gasoline. Hydrocarbon fractions boiling at a temperature ranging from about 430° F. to about 675° F. may be alternatively and more profitably directed to distillate and diesel fuel product pools but can be, depending on refinery economics, directed to a fluid catalytic cracking process for further upgrading to gasoline.

Hydrocarbon fractions boiling at a temperature of greater than about 1000° F. at atmospheric pressure are generally regarded as residual fractions. Such residual fractions commonly contain higher proportions of components that tend to form low value coke in the fluid catalytic cracking process. Residual fractions also generally contain higher concentrations of undesirable metals such as nickel and vanadium which further catalyze the formation of coke. While upgrading residual components to higher value, lower boiling hydrocarbons is often profitable for the refiner, the deleterious effects of higher coke production, such as higher regenerator temperatures, lower catalyst to oil ratios, accelerated catalyst deactivation, lower conversions, and increased use of costly flushing or equilibrium catalyst for metals control must be weighed against these benefits.

Typical gas oil and long resid fractions are generally derived from any one or more of several refinery process sources including but not limited to a low, medium, or high sulfur crude unit atmospheric and/or vacuum distillation tower, a delayed or fluidized coking process, a catalytic hydrocracking process, and/or a distillate, gas oil, or resid hydrotreating process. Moreover, fluid catalytic cracking process feedstocks can be derived as bi-products from any one of several lubricating oil manufacturing facilities including, but not limited to a lubricating oil viscosity fractionation unit, solvent extraction process, solvent dewaxing process, or hydrotreating process. Moreover, fluid catalytic cracking process feedstocks can also be derived through recycle of various product streams produced at a fluid catalytic cracking process. Recycle streams such as decanted oil, heavy catalytic cycle oil, and light catalytic cycle oil may be recycled directly or may pass through other processes such as a hydrotreating process prior to directing to the fluid catalytic cracking process.

The fluid catalytic cracking process in accordance with the present invention generally comprises a reaction step wherein a catalyst is contacted directly with a feedstock and a catalytically cracked product formed, a separation step wherein the coked catalyst is separated from the catalytically cracked product, a stripping step wherein a substantial amount of the hydrocarbon that remains with the separated coked catalyst is removed, and a regeneration step wherein coke is combusted from the catalyst for reuse in the reaction step.

A detailed process description of a fluid catalytic cracking process in accordance with the present invention generally begins with a feedstock preheating step. The feedstock is generally preheated from waste heat provided from downstream process fractionation steps including, but not limited to, the main fractionator pumparound systems. These main fractionator waste heat pumparound systems circulate fractionator streams comprising any or all of cracked gasoline, light catalytic cycle oil, heavy catalytic cycle oil, and decanted oil or slurry to facilitate the removal of heat from critical sections of the fractionator. The feedstock preheat temperature prior to reaction generally ranges from about 200° F. to about 700° F.

The preheated feedstock is contacted with a regenerated fluidized catalytic cracking catalyst in accordance with the present invention, provided at a temperature generally ranging from about 900° F. to about 1500° F., and immediately and substantially vaporized and reacted through and within a riser reactor or fluidized bed reactor. The mixture of catalytic cracking catalyst and catalytically cracked hydrocarbon generally exit the riser reactor at a reaction temperature ranging from about 850° F. to about 1250° F., preferably from about 900° F. to about 1200° F., and more preferably from about 950° F. to about 1100° F. for best results. The pressure of most modern fluid catalytic cracking processes generally ranges from about 10 psig to about 100 psig and more preferably from about 20 psig to about 50 psig for best results. Typical catalyst to oil ratios, measured in weight of catalyst to weight of oil, generally range from about 2:1 to about 20:1, preferably from about 4:1 to about 14:1, and more preferably from about 5:1 to about 10:1 for best results.

The feedstock reacts with the fluid catalytic cracking catalyst and is substantially catalytically cracked before exiting the riser reactor of most modern fluid catalytic cracking processes. Coke is generally deposited on the fluid catalytic cracking catalyst during the reaction and the coked catalyst and catalytically cracked hydrocarbon are directed to a separation means for separating the coked catalyst from the cracked hydrocarbon. Where the catalyst remains in contact with the catalytically cracked hydrocarbon for an overly extended period before separation, overcracking of valuable gasoline components to lower valued light hydrocarbon gases can occur. Therefore, it is generally desirable to effect separation substantially immediately after the catalytic cracking reaction is complete in order to avoid such overcracking.

Separation can take place in any of several stages in series and/or several stages in parallel wherein the separation stages can comprise any one or several of various separation means known to those skilled in the art including cyclone separation, ballistic separation, and inertial separation. Separation can be performed with a rough cut or gross cut separation means for removing a substantial portion of the coked catalyst, followed by secondary and tertiary separators for performing a fine separation. Any one or more of the separation stages can also be performed within an enclosed disengager vessel, external to an enclosed disengager vessel, or external to the riser reactor and in the absence of an enclosed disengager vessel.

Once the coked fluid catalytic cracking catalyst has been separated from the catalytically cracked oil, the separated catalyst is generally directed to a stripping means for stripping volatile hydrocarbon from the catalyst prior to regeneration. Without such a stripping step, valuable hydrocarbon can be directed to the regenerator step and uneconomically combusted along with the catalyst coke. The stripping section generally comprises a series of baffles or trays for directing the catalyst along a convoluted path wherein the catalyst is stripped of volatile hydrocarbon by the presence of steam or another generally gaseous stripping component.

The separated and stripped coked catalyst is subsequently directed to a regenerator for combustion of the coke from the catalyst. The catalyst is thereby heated to regeneration temperatures and the heat of regeneration recovered to supply the heat for the catalytic cracking reaction. Regenerator temperatures generally range from a temperature of about 800° F. to about 1600° F., preferably from about 900° F. to about 1500° F., and more preferably from about 950° F. to about 1450° F. for best results. Temperatures below these ranges may result in insufficient combustion of coke from the catalyst and necessitate use of torch oil to maintain regeneration temperatures. Excessively high temperatures can damage the catalyst and regenerator vessel internals. Thereby, most catalytic cracking processes operate substantially in heat balance.

The catalytically cracked hydrocarbon product separated from the coked catalyst in the separation step is then directed to a fractionation step wherein the product is separated into finished product blending components and downstream process feedstocks. These products can include FCC wet gas, FCC wild gasoline, FCC light catalytic cycle oil, FCC heavy catalytic cycle oil, and FCC slurry or decanted oil. Wet gas generally comprises hydrocarbon having 5 or less carbon atoms. Wild gasoline generally comprises hydrocarbon having 5 or more carbon atoms and boiling at a temperature below about 430° F. at atmospheric pressure. Light catalytic cycle oil generally comprises hydrocarbon boiling at a temperature ranging from about 150° F. to about 675° F. at atmospheric pressure. Heavy catalytic cycle oil and decanted oil generally comprise hydrocarbon boiling at a temperature ranging from about 500° F. to about 1200° F. at atmospheric pressure.

The fractionator feed or catalytically cracked and separated hydrocarbon product enters the fractionator at a temperature generally approximating the final separator or disengager outlet temperature. The fractionator comprises a series of fractionator pumparound loops which remove heat from the tower in a manner so as to provide a fractionator temperature profile for removing products having a particular boiling range. The heat from the pumparound loops is generally transferred to the fluid catalytic cracking process feedstock as preheat for the process as described hereabove.

The catalyst modification step of the present invention can be incorporated directly into the fluid catalytic cracking process or can be performed during or after the catalyst formation step. For example, the catalyst modification can be performed by the catalyst manufacturer and the modified catalyst sold to the commercial user. In other scenarios, the catalyst modification steps, in various phases or in their entirety, can be incorporated into the commercial fluid catalytic cracking process itself.

Wherein the modification step is performed at the fluid catalytic cracking unit, several synergies are present for retrofitting existing fluid catalytic cracking facilities with the modification process. The fluid catalytic cracking catalyst to be modified can be, but is not limited to, the fresh catalyst that has been or is in the process of being off-loaded to catalyst storage facilities, equilibrium catalyst that has been or is in the process of being off-loaded to catalyst storage facilities, or spent or regenerated catalyst from various positions along the fluid catalytic cracking process.

The fluid catalytic cracking process is generally equipped with facilities for transporting solids such as, but not limited to air compressors at the transport origination location and pneumatic conveying devices along the catalyst transport conduits. Such technology can be extended to accommodate the movement of catalyst through the modification steps of the present invention.

Similarly, heat sources and sinks that are present in the fluid catalytic cracking process can also be usefully applied to the modification method. A substantial source of heat is the catalyst regenerator wherein transferring heat from the regenerator to the modification process can be synergistically profitable for increasing the catalyst to oil ratio and conversion of the fluid catalytic cracking process.

A typical commerical process can begin with an ammonium exchange step wherein the catalyst is combined with a component such as ammonium acetate in a reaction vessel or a mixing conduit. The slurry of catalyst and solution can be subsequently separated in a physical separation step such as filtration and/or rotary centrifuge and the separated liquid recycled back to the ammonium exchange step.

The ammonium exchanged catalyst can be combined with the trivalent cation, the trivalent cation complexing agent, and the hydroxide-producing component in a reaction vessel or mixing conduit. The trivalent cation and trivalent cation complexing agent are generally added in ratio control to each other in accordance with the teachings herein while the hydroxide-producing component is generally added to control the pH of the final mixture. The final mixture can then be directed to a physical separation step such as filtration and/or rotary centrifuge while the separated liquid is directed to a solvent recovery step.

The once modified catalyst can be modified a total of once, twice, or several times based on the economies and effectiveness of catalyst modification. Wherein catalyst is modified more than once, subsequent steps will generally be provided similar to those described for the first modification step. The modified catalyst from the last physical separation step can then be dried and- /or calcined and conveyed to the fluid catalytic cracking process directly or to catalyst storage. The separated liquid from the physical separation step is generally directed to a solvent recovery step.

The solvent recovery step is generally provided for recovering the trivalent cation complexing agent (i.e., lactic acid) and reusing it with the modification method. The liquid recovered from one or more of the physical separation steps can be heated either directly or from waste heat recovered from the fluid catalytic cracking process and directed to a distillation step for removing water from the solution. The remaining bottoms product will generally comprise spent lactic acid, the excess unexchanged trivalent cation, the exchanged-for cation, and various metallic cations.

The bottoms product can then be acid treated by contact with a suitable acid such as sulfur acid for facilitating the conversion of lactate components to lactic acid. The acidic bottoms product can then be directed to a second distillation step for removal of the lactic acid overhead. The recovered lactic acid can then be recycled back to the modification steps for reducing solvent usage and costs. The remaining solution of excess unexchanged trivalent cation, exchanged-for cations, and various metals can be conveyed directly to a metals reclaimer or processed additionally for internal use or directing to a metals reclaimer. Additional processing steps can include conversion of such metallic cations to the more valuable and marketable carbonate form.

Other embodiments of the present invention will become apparent to those skilled in the art from a fundamental knowledge of catalytic cracking processes and the process steps taught herein.

The fluid catalytic cracking catalyst and process of the present invention is a clear improvement over the methods of the prior art.

The fluid catalytic cracking catalyst and process of the present invention provide for modification or ion exchange of a fluid catalytic cracking catalyst comprising a molecular sieve with trivalent cations while minimizing leaching of framework and exchanged metal components that can reduce catalyst activity and selectivity. Wherein the trivalent cation is aluminum, the catalyst and process of the present invention provide for increases in the level of exchangeable site aluminum, compared to prior art catalysts and processes, of more than 25 percent, typically of more than 50 percent, commonly of more than 75 percent, and often of more than 100 percent.

The fluid catalytic cracking catalyst and process of the present invention provide for modification or ion exchange of a fluid catalytic cracking catalyst comprising a molecular sieve at a pH above 4. Where prior art methods for trivalent cation exchange generally required a pH of less than 4 in order to insure that aluminum hydroxide does not precipitate from the ion exchange solution, the process of the present invention permits and utilizes a pH of greater than 4.0 and preferably from about 4.0 to about 8.0, in order to reduce framework and exchanged metal leaching. The catalyst and process of the present invention also provides for a reduction in the level of framework element losses, by weight, of more than 20 percent compared to prior art ion exchange methods, typically of more than 40 percent, commonly of more than 55 percent, and often of more than 60 percent.

The fluid catalytic cracking catalyst and process of the present invention provides for the modification or ion exchange of any one of numerous trivalent cations into any one of numerous fluid catalytic cracking catalysts comprising molecular sieves, while substantially simplifying the delicate acidity balance of ion exchange effectiveness, the precipitation of the trivalent cation hydroxide, and framework element leaching.

The fluid catalytic cracking catalyst and process of the present invention provide for a yield of iso-olefins that is substantially higher than processes which do not utilize the inventive process and catalyst. In particular, the process and catalyst of the present invention provide for a fluid catalytic cracking process yielding iso-olefins having 4 and 5 carbon atoms at a level more than 10 percent higher, more than 14 percent higher, and commonly more than 19 percent higher, by weight, than comparable processes that do not utilize the inventive process and catalyst.

The present invention is described in further detail in connection with the following examples, it being understood that the same are for the purposes of illustration and not limitation.

EXAMPLE 1

Approximately 750.1 grams of a commercially available fluid catalytic cracking catalyst, produced by manufacturer A, was ammonium exchanged with 301 grams of ammonium acetate in enough deionized water to provide four liters of solution. The ammonium exchange was conducted for a period of 5 hours at a temperature ranging from about 90° C. to about 100° C. The ammonium exchanged commercial catalyst was filtered from the exchange solution, washed with about 200 ml of deionized water, and filter dried overnight. About 210 grams of the dried solid was program calcined using a calcining program comprising holding the catalyst at a temperature of 104° C. for a period of 4 hours in an air purged Hoskins furace, raising the temperature to 537° C. over a period of 4 hours, holding the temperature at 537° C. for a period of 4 hours, reducing the temperature to 104° C. over a period of 4 hours.

EXAMPLE 2

The ammonium exchanged commercial fluid catalytic cracking catalyst of Example 1 was processed in accordance with the process of the present invention. An aluminum lactate complex solution was prepared by adding 80.0 grams of aluminum nitrate $(Al(NO_3)_3 \cdot 9H_2O)$, 78.9 grams of 90 percent by weight lactic acid, and 60.2 grams of ammonium hydroxide to 1600.0 grams of deionized water. The pH of the ion exchange solution was 6.01. Approximately 270.1 grams of the ammonium exchanged commercial fluid catalytic cracking catalyst from Example 1 was added to the solution which then had a final pH of 6.08. The ion exchange was performed for about 5 hours at a temperature of from about 90° C. to about 100° C. The aluminum exchanged commercial catalyst was filtered from the exchange solution, washed with about 2 liters of deionized water, and filter dried for about 16 hours.

A second aluminum ion exchange was performed with the once aluminum ion exchanged catalyst by preparing a second ion exchange solution comprising 80.1 grams of $(Al(NO_3)_3 \cdot 9H_2O)$, 80.0 grams of 90 percent by weight lactic acid, and 63.3 grams of ammonium hydroxide in 1600.0 grams of deionized water. The pH of the ion exchange solution was 6.02. Approximately 285.8 grams of the singularly exchanged commercial catalyst was added to the solution which then had a final pH of 6.09. The ion exchange was performed for about 5 hours at a temperature of from about 90° C. to about 100° C. The aluminum exchanged commercial catalyst was filtered from the exchange solution, washed with about 2 liters of deionized water, and program calcined in accordance with the calcination program described in Example 1.

The twice aluminum exchanged commercial fluid catalytic cracking catalyst was steamed by loading approximately 200.0 grams of the calcined commercial catalyst into a 1.25 inch ID quartz tube. The catalyst was steamed at about 816° C. for a period of about 5 hours with substantially pure steam having a water flow of about 60 ml per hour. The twice aluminum exchanged and steamed commercial fluid catalytic cracking catalyst was designated as Catalyst A1.

EXAMPLE 3

Approximately 200 grams of the calcined fluid catalytic cracking catalyst of Example 1 was steamed for comparison with the twice aluminum exchanged and steamed catalyst of Example 2. Steaming was performed in a manner consistent with the method described above in Example 2. The steamed only commercial fluid catalytic cracking catalyst was designated as Catalyst A1 Base.

EXAMPLE 4

The catalytic activity of Catalysts A1 and A1 Base from Examples 3 and 4 respectively, were determined in a microactivity test unit similar to that described in ASTM Test Method D 3907-87. The feedstock was a conventional fluid catalytic cracking feedstock from Amoco Oil Company's Whiting Refinery in Whiting, Ind. The properties of the feedstock are provided in Table 1.

TABLE 1

| TOTAL FEED PROPERTIES | |
|---|---|
| Gravity, API | 21.60 |
| Paraffins, Wt. % | 19.44 |
| Sulfur, Wt. % | 2.60 |
| Total Nitrogen, Wt. % | 0.13 |
| Rams Carbon Wt. % | 0.22 |
| Total Molecular Weight | 381 |
| Ni, ppm | 1 |
| V, ppm | 1 |
| Cu, ppm | 0 |
| Fe, ppm | 1 |
| Na, ppm | 0 |
| Co, ppm | 0 |
| Mo, ppm | 0 |
| ABP, °F. | 813.0 |
| 20%, °F. | 714.0 |
| 80%, °F. | 910.0 |
| 430 F. TBP Vol. % | 0 |
| 450 F. TBP Vol. % | 0 |
| 500 F. TBP Vol. % | 0 |
| 550 F. TBP Vol. % | 0.9 |
| 600 F. TBP Vol. % | 3.4 |
| 650 F. TBP Vol. % | 6.9 |
| 700 F. TBP Vol. % | 15.9 |
| 750 F. TBP Vol. % | 30.9 |
| 800 F. TBP Vol. % | 46.2 |
| 850 F. TBP Vol. % | 63.1 |
| 900 F. TBP Vol. % | 77.8 |
| 950 F. TBP Vol. % | 87.6 |
| 1000 F. TBP Vol. % | 96.4 |
| 1100 F. TBP Vol. % | 100.0 |

The microactivity test for both A1 and A1 Base were performed at substantially constant catalyst to oil ratios. Selected product yields, with a particular focus on $C_4$ and $C_5$ olefinic hydrocarbons suitable for use in subsequent etherification and alkylation processes, were determined by weight. The results of these tests are described in Table 2.

The commercial fluid catalytic cracking catalyst processed in accordance with the present invention, Example 2, produced a higher yield of total $C_4$ and $C_5$ olefinic hydrocarbons than the base case of Example 1. Similarly, the yield of iso-olefins was also higher, which is particularly desirable in view of their usefulness as etherification process feedstocks.

EXAMPLE 5

Approximately 405.9 grams of a commercially available fluid catalytic cracking catalyst, produced by manufacturer B, was ammonium exchanged with 408.5 grams of ammonium acetate in enough deionized water to provide four liters of solution. The ammonium exchange was conducted for a period of 5 hours at a temperature ranging from about 90° C. to about 100° C. The ammonium exchanged commercial catalyst was filtered from the exchange solution, washed with about 2 liters of deionized water, and filter dried overnight. About 240 grams of the dried solid was program calcined at a temperature of about 537° C. using the calcining program described in Example 1.

EXAMPLE 6

The ammonium exchanged commercial fluid catalytic cracking catalyst of Example 5 was processed in accordance with the process of the present invention. An aluminum lactate complex solution was prepared by adding 80.2 grams of aluminum nitrate $(Al(NO_3)_3 \cdot 9H_2O)$, 75.4 grams of 90 percent by weight lactic acid, and 56.2 grams of ammonium hydroxide to 1600.1 grams of deionized water. The pH of the ion exchange solution was 6.10. An additional 1.8 grams of lactic acid was added to the solution to bring the solution pH to 6.10. Approximately 329.3 grams of the ammonium exchanged commercial fluid catalytic cracking catalyst from Example 5 was added to the solution which then had a final pH of 6.12. The ion exchange was performed for about 5 hours at a temperature of from about 90° C. to about 100° C. The aluminum exchanged commercial catalyst was filtered from the exchange solution, washed with about 2 liters of deionized water, and filter dried for about 16 hours.

A second aluminum ion exchange was performed with the once aluminum ion exchanged catalyst by preparing a second ion exchange solution comprising 80.4 grams of $(Al(NO_3)_3 \cdot 9H_2O)$, 74.5 grams of 90 percent by weight lactic acid, and 63.3 grams of ammonium hydroxide in 1600.2 grams of deionized water. The pH of the ion exchange solution was 5.94. Approximately 218.8 grams of the singularly exchanged commercial catalyst was added to the solution which then had a final pH of 6.09. The ion exchange was performed for about 5 hours at a temperature of from about 90° C. to about 100° C. The aluminum exchanged commercial catalyst was filtered from the exchange solution, washed with about 2 liters of deionized water, dried for 16 hours, and program calcined in accordance with the calcination program described in Example 1.

The twice aluminum exchanged commercial fluid catalytic cracking catalyst was steamed by loading approximately 200.0 grams of the calcined commercial catalyst into a 1.25 inch ID quartz tube. The catalyst was steamed at about 816° C. for a period of about 5 hours with substantially pure steam having a water flow of about 60 ml per hour. The twice aluminum exchanged and steamed commercial fluid catalytic cracking catalyst was designated as Catalyst B1.

EXAMPLE 7

Approximately 200 grams of the calcined fluid catalytic cracking catalyst of Example 5 was steamed for comparison with the twice aluminum exchanged and steamed catalyst of Example 6. Steaming was performed in a manner consistent with the method described above in Example 2. The steamed only commerical fluid catalytic cracking catalyst was designated as Catalyst B1 Base.

EXAMPLE 8

The catalytic activity of Catalysts B1 and B1 Base from Examples 6 and 7 respectively, were determined in a microactivity test unit similar to that described in ASTM Test Method D 3907-87. The feedstock was the same as that described in Example 4.

The microactivity test for both B1 and B1 Base were performed at substantially constant catalyst to oil ratios. Selected product yields, with a particular focus on $C_4$ and $C_5$ olefinic hydrocarbons suitable for use in subsequent etherification and alkylation processes, were determined by weight. The results of these tests are described in Table 2.

The commercial fluid catalytic cracking catalyst processed in accordance with the present invention, Example 6, produced a substantially higher yield of total $C_4$ and $C_5$ olefinic hydrocarbons than the base case of Example 7. Similarly, the yield of iso-olefins was also substantially higher, which is particularly desirable in view of their usefulness as etherification process feedstocks. Conversion and coke yield was also lower for the B1 Base case than for the B1 case, which may have contributed to the larger margin of difference.

EXAMPLE 9

Approximately 609.1 grams of a different commercially available fluid catalytic cracking catalyst, produced by manufacturer A, was ammonium exchanged with 502.3 grams of ammonium acetate in enough deionized water to provide four liters of solution. The ammonium exchange was conducted for a period of 5 hours at a temperature ranging from about 90° C. to about 100° C. The ammonium exchanged commercial catalyst was filtered from the exchange solution, washed with about 2 liters of deionized water, and filter dried overnight. About 200 grams of the dried solid was program calcined at a temperature of about 537° C. using the calcining program described in Example 1.

EXAMPLE 10

The ammonium exchanged commercial fluid catalytic cracking catalyst of Example 9 was processed in accordance with the process of the present invention. An aluminum lactate complex solution was prepared by adding 80.2 grams of aluminum nitrate ($Al(NO_3)_3.9H_2O$), 74.5 grams of 90 percent by weight lactic acid, and 57.0 grams of ammonium hydroxide to 1600.0 grams of deionized water. The pH of the ion exchange solution was 5.97. Approximately 318.3 grams of the ammonium exchanged commercial fluid catalytic cracking catalyst from Example 9 was added to the solution which then had a final pH of 5.99. The ion exchange was performed for about 5 hours at a temperature of from about 90° C. to about 100° C. The aluminum exchanged commercial catalyst was filtered from the exchange solution, washed with about 2 liters of deionized water, and filter dried for about 16 hours.

A second aluminum ion exchange was performed with the once aluminum ion exchanged catalyst by preparing a second ion exchange solution comprising 80.4 grams of ($Al(NO_3)_3.9H_2O$), 74.1 grams of 90 percent by weight lactic acid, and 56.9 grams of ammonium hydroxide in 1600.4 grams of deionized water. The pH of the ion exchange solution was 5.94. Approximately 333.6 grams of the singularly exchanged commercial catalyst was added to the solution which then had a final pH of 6.09. The ion exchange was performed for about 5 hours at a temperature of from about 90° C. to about 100° C. The aluminum exchanged commercial catalyst was filtered from the exchange solution, washed with about 2 liters of deionized water, and program calcined in accordance with the calcination program described in Example 1.

The twice aluminum exchanged commercial fluid catalytic cracking catalyst was steamed by loading approximately 200.0 grams of the calcined commercial catalyst into a 1.25 inch ID quartz tube. The catalyst was steamed at about 816° C. for a period of about 5 hours with substantially pure steam having a water flow of about 60 ml per hour. The twice aluminum exchanged and steamed commercial fluid catalytic cracking catalyst was designated as Catalyst A2.

EXAMPLE 11

Approximately 200 grams of the calcined fluid catalytic cracking catalyst of Example 9 was steamed for comparison with the twice aluminum exchanged and steamed catalyst of Example 10. Steaming was performed in a manner consistent with the method described above in Example 2. The steamed only commercial fluid catalytic cracking catalyst was designated as Catalyst A2 Base.

EXAMPLE 12

The catalytic activity of Catalysts A2 and A2 Base from Examples 10 and 11 respectively, were determined in a microactivity test unit similar to that described in ASTM Test Method D 3907-87. The feedstock was the same as that described in Example 4.

The microactivity test for both A2 and A2 Base were performed at substantially constant catalyst to oil ratios. Selected product yields, with a particular focus on $C_4$ and $C_5$ olefinic hydrocarbons suitable for use in subsequent etherification and alkylation processes, were determined by weight. The results of these tests are described in Table 2.

The commercial fluid catalytic cracking catalyst processed in accordance with the present invention, Example 10, produced a lower yield of total $C_4$ and $C_5$ olefinic hydrocarbons than the base case of Example 11. This may be largely due to lower catalyst activity as reflected in the lower conversion and coke yield. At equivalent coke yields inherent to commercial heat balanced fluid catalytic cracking units, the total yield to $C_4$ and $C_5$ olefinic hydrocarbons would be expected to meet or exceed those of the A2 Base case. While overall conversion and conversion to $C_4$ and $C_5$ olefinic hydrocarbons for the A2 catalyst was lower than in the A2 Base case, the yield of $C_4$ and $C_5$ iso-olefins remained substantially higher for the A2 catalyst than for the A2 Base case.

TABLE 2

| | CATALYST | | | | | |
|---|---|---|---|---|---|---|
| | A1 Base | A1 | B1 Base | B1 | A2 Base | A2 |
| PROCESS CONDITIONS | | | | | | |
| Reaction Temperature, °F. | 976 | 971 | 971 | 971 | 971 | 969 |
| Catalyst To Oil Ratio | 3.00 | 2.99 | 3.15 | 3.00 | 3.05 | 3.05 |
| WHSV, hr$^{-1}$ | 24.01 | 24.11 | 22.85 | 23.97 | 23.60 | 23.58 |
| PRODUCT YIELDS | | | | | | |
| Conversion, Wt. % | 64.4 | 63.8 | 65.9 | 70.3 | 62.9 | 58.1 |
| Weight Balance, Wt. % | 99.9 | 100.3 | 95.5 | 99.4 | 97.0 | 96.7 |
| Normalized Yields, Wt. % | | | | | | |
| $C_3=$ | 4.41 | 4.51 | 4.67 | 4.89 | 4.33 | 3.90 |
| $NC_4=$ | 4.12 | 4.18 | 4.31 | 4.76 | 3.75 | 3.75 |
| $IC_4=$ | 1.60 | 1.83 | 1.74 | 2.00 | 1.50 | 1.84 |
| $NC_5=$ | 1.80 | 1.90 | 2.04 | 2.27 | 4.20 | 1.99 |
| $IC_5=$ | 2.58 | 2.83 | 2.68 | 3.29 | 1.94 | 2.83 |
| TOTAL $C_4= + C_5=$ | 10.10 | 10.74 | 10.77 | 12.32 | 11.39 | 10.41 |
| TOTAL $IC_4= + IC_5=$ | 4.18 | 4.66 | 4.42 | 5.29 | 3.44 | 4.67 |
| $C_5$-430° F.$^-$ | 41.80 | 41.10 | 42.09 | 44.07 | 41.43 | 39.31 |
| COKE | 4.15 | 4.03 | 3.34 | 4.69 | 3.37 | 2.43 |
| $H_2/CH_4$ Ratio | 1.09 | 1.18 | 0.82 | 1.20 | 1.26 | 1.34 |

EXAMPLE 13

Approximately 5 kilograms of a commercially available fluid catalytic cracking catalyst, produced by manufacturer B, was steamed for comparison with the same commercial catalyst treated in accordance with the process of the present invention. Steaming was performed generally in accordance with the method described in Example 2 except that steaming was performed at a higher temperature of about 78° C. and for a longer period of about 10 hours. Initially, a stream of nitrogen was used to fluidize the catalyst. As the temperature was increased, the nitrogen was turned off and fluidization was due to the steam flow only. The steamed only commercial fluid catalytic cracking catalyst was designated as Catalyst B2 Base.

Approximately 3 kilograms of the steamed B2 Base catalyst were charged to a riser cracking pilot plant. The feedstock was a conventional fluid catalytic cracking feedstock from Amoco Oil Company's Whiting Refinery in Whiting, Ind. The properties of the feedstock are provided in Table 3.

TABLE 3

| TOTAL FEED PROPERTIES | |
|---|---|
| Gravity, API | 18.70 |
| Paraffins, Wt. % | 18.11 |
| Sulfur, Wt. % | 2.51 |
| Nitrogen, Wt. % | 0.132 |
| Rams Carbon Wt. % | 0.30 |
| Molecular Weight | 420 |
| Ni, ppm | 0 |
| V, ppm | 0 |
| Cu, ppm | 0 |
| Fe, ppm | 0 |
| Na, ppm | 0 |
| Co, ppm | 0 |
| Mo, ppm | 0 |
| ABP, °F. | 863 |
| 20%, °F. | 788 |
| 80%, °F. | 950 |
| 430 F. TBP Vol. % | 0 |
| 450 F. TBP Vol. % | 0 |
| 500 F. TBP Vol. % | 0 |
| 550 F. TBP Vol. % | 0 |
| 600 F. TBP Vol. % | 0 |
| 650 F. TBP Vol. % | 0.9 |
| 700 F. TBP Vol. % | 3.9 |
| 750 F. TBP Vol. % | 9.85 |
| 800 F. TBP Vol. % | 24.5 |

TABLE 3-continued

| TOTAL FEED PROPERTIES | |
|---|---|
| 850 F. TBP Vol. % | 44.3 |
| 900 F. TBP Vol. % | 64.1 |
| 950 F. TBP Vol. % | 80.1 |
| 1000 F. TBP Vol. % | 91.0 |
| 1100 F. TBP Vol. % | 100.00 |

The riser cracking plant process flow scheme approximates a commercial fluid catalytic cracking process and comprises a riser reactor, a disengager, a catalyst stripper, and a regenerator. The reaction conditions, product yields, and product properties were determined for two separate runs and are described in Table 4.

EXAMPLE 14

Approximately 80.5 kilograms of deionized water, 9.9 kilograms of ammonium acetate, and 9.8 kilograms of the same commercially available fluid catalytic cracking catalyst described in Example 13, were placed in a 30 gallon autoclave reactor. The reactor was closed, sealed, and stirred at 30 rpm. The reactor heaters were set at 90° C. and turned on. The hot slurry was pumped through a large filter press and the filtered particulate washed with about 30 gallons of distilled water.

A solution of 56.3 kilograms of deionized water, 3.824 kilograms of aluminum nitrate nonahydrate, 3.553 kilograms of 90 percent lactic acid, 2.921 kilograms of concentrated ammonium hydroxide, and 291.6 grams of nitric acid was prepared having a pH of 5.95. The solution was allowed to stand for 16 hours.

The solution was transferred to the autoclave reactor along with an additional 20.1 kilograms of deionized water. The pH of the solution was adjusted from a pH of 5.65 to a pH of 5.99 by the addition of 49.2 grams of concentrated ammonium hydroxide. Approximately 9.8 kilograms of the ammonium exchanged commercial catalyst was added to the solution and mixed thoroughly. The pH of the slurry was 6.50. The pH of the slurry was adjusted to a pH of 6.00 with the addition of 69.7 grams of concentrated nitric acid.

The reactor was closed, sealed, and the reactor stirrer started at 30 rpm. The reactor heaters were set at 90° C. and turned on. The first ammonium aluminum lactate treatment was for five hours. The hot slurry was pumped through a large filter press and the filtered particulate washed with about 25 gallons of distilled water.

A second catalyst treatment with ammonium aluminum lactate was performed by preparing a solution of 76.5 kilograms of deionized water, 3.83 kilograms of aluminum nitrate nonahydrate, and 2.63 kilograms of concentrated ammonium hydroxide in a 30 gallon autoclave reactor. After thorough mixing, the pH of the solution was 5.55. The previously treated catalyst was added to the solution and thoroughly mixed. The pH of the solution remained at 5.55. An additional 136.1 grams of concentrated ammonium hydroxide was added to the slurry to raise the pH to 6.00.

The reactor was closed, sealed, and the reactor stirrer started at 30 rpm. The reactor heaters were set at 90° C. and turned on. The second ammonium aluminum lactate modification was for five hours. The hot slurry was pumped through a large filter press and the filtered particulate washed with about 25 gallons of distilled water. The filter cake was dried at 110° C. for 16 hours and program calcined in accordance with the calcination program described in Example 1.

Approximately 5 kilograms of calcined catalyst was steamed generally in accordance with the method described in Example 2 except that steaming was performed at a higher temperature of about 787° C. and for a longer period of about 11.5 hours. Initially, a stream of nitrogen was used to fluidize the catalyst. As the temperature was increased, the nitrogen was turned off and fluidization was due to the steam flow only. The twice aluminum exchanged and steamed commercial fluid catalytic cracking catalyst was designated as Catalyst B2.

Approximately 3 kilograms of the modified and steamed B2 catalyst was charged to a riser cracking pilot plant. The riser cracking pilot plant was the same riser cracking pilot plant described in Example 14. The reaction conditions, product yields, and product properties were determined for two separate runs and are described in Table 4.

The commercial fluid catalytic cracking catalyst processed in accordance with the present invention, Example 14, produced similar average yields of total $C_4$ and $C_5$ olefinic hydrocarbons to the base case of Example 13. The yield of $C_4$ and $C_5$ iso-olefins remained substantially higher for the B2 catalyst than for the B2 Base case. The Research Octane of the $C_5$—430° F— stream for the B2 Catalyst test case was also substantially increased. No consistent patterns between FCC hydrocarbon conversion and the method of the present invention emerged, as can be inferred from Examples 4, 8, 12, and 14. This was to be expected since each of the commercial FCC catalysts are prepared in different ways which result in different chemical modifications and different catalytic effects.

EXAMPLE 15

Approximately 711.8 grams of a commercially available fluid catalytic cracking catalyst, produced by manufacturer B, was ammonium exchanged with 722.5 grams of ammonium acetate in enough deionized water to provide six liters of solution. The ammonium exchange was conducted for a period of 5 hours at a temperature ranging from about 90° C. to about 100° C. The ammonium exchanged commercial catalyst was filtered from the exchange solution, washed with about 2 liters of deionized water, and filter dried overnight. About 240 grams of the dried solid was program calcined at a temperature of about 537° C. using the calcining program described in Example 1.

EXAMPLE 16

The ammonium exchanged commercial fluid catalytic cracking catalyst of Example 15 was processed in accordance with the process of the present invention. An aluminum lactate complex solution was prepared by adding 160.5 grams of aluminum nitrate $(Al(NO_3)_3 \cdot 9H_2O)$, 148.8 grams of 90 percent by weight lactic acid, and 113.7 grams of ammonium hydroxide to 3200.3 grams of deionized water. The pH of the ion exchange solution was 6.00. Approximately 631.4 grams of the ammonium exchanged commercial fluid catalytic cracking catalyst from Example 15 was added to the solution which then had a final pH of 5.85. An additional 2.18 grams of 90 percent concentrated ammonium hydroxide was added to the solution to adjust the pH to 6.00. The ion exchange was performed for about 5 hours at a temperature of from about 90° C. to about 100° C. The aluminum exchanged commercial catalyst was filtered from the exchange solution, washed with about 2 liters of deionized water, and filter dried for about 16 hours.

A second aluminum ion exchange was performed with the once aluminum ion exchanged catalyst by preparing a second ion exchange solution comprising 80.3 grams of $(Al(NO_3)_3 \cdot 9H_2O)$, 74.4 grams of 90 percent by weight lactic acid, and 58.3 grams of ammonium hydroxide in 1600.0 grams of deinized water. The pH of the ion exchange solution was 5.94. Approximately 301.3 grams of the singularly exchanged commercial catalyst was added to the solution which then had a final pH of 5.98. The ion exchange was performed for about 5 hours at a temperature of from about 90° C. to about 100° C. The aluminum exchanged commercial catalyst was filtered from the exchange solution, washed with about 0.2 liters of deionized water, and program calcined in accordance with the calcination program described in Example 1.

The twice aluminum exchanged commercial fluid catalytic cracking catalyst was steamed by loading approximately 200.0 grams of the calcined commercial catalyst into a 1.25 inch ID quartz tube. The catalyst was steamed at about 816° C. for a period of about 5 hours with substantially pure steam having a water flow of about 60 ml per hour. The twice aluminum exchanged and steamed commercial fluid catalytic cracking catalyst was designated as Catalyst B3.

EXAMPLE 17

Approximately 230 grams of the calcined fluid catalytic cracking catalyst of Example 15 was steamed for comparison with the twice aluminum exchanged and steamed catalyst of Example 16. Steaming was performed in a manner consistent with the method described above in Example 2. The steamed only commercial fluid catalytic cracking catalyst was designated as Catalyst B3 Base.

EXAMPLE 18

The catalytic activity of Catalysts B3 and B3 Base from Examples 16 and 17 respectively, were determined in a microactivity test unit similar to that described in ASTM Test Method D 3907-87. Three runs were made for each of the respective catalysts. The feedstock was the same as that described in Example 4 and Table 1.

The microactivity test for both B3 and B3 Base were performed at substantially constant catalyst to oil ratios. Selected product yields, with a particular focus on $C_4$ and $C_5$ olefinic hydrocarbons suitable for use in subsequent etherification and alkylation processes, were determined by weight. The results of these tests are described in Table 4.

The commercial fluid catalytic cracking catalyst processed in accordance with the present invention, Example 16, produced a higher yield of total $C_4$ and $C_5$ olefinic hydrocarbons than the base case of Example 17, even at substantially constant hydrocarbon conversion. The yield of $C_4$ and $C_5$ isoolefins remained substantially higher for the B3 catalyst than for the B3 Base case.

EXAMPLE 19

Approximately 712.3 grams of a commercially available fluid catalytic cracking catalyst, produced by manufacturer B, was ammonium exchanged with 710.9 grams of ammonium acetate in enough deionized water to provide six liters of solution. The ammonium exchange was conducted for a period of 5 hours at a temperature ranging from about 90° C. to about 100° C. The ammonium exchanged commercial catalyst was filtered from the exchange solution, washed with about 2 liters of deionized water, and filter dried overnight. About 240 grams of the dried solid was program calcined at a temperature of about 537° C. using the calcining program described in Example 1.

EXAMPLE 20

The ammonium exchanged commercial fluid catalytic cracking catalyst of Example 19 was processed in accordance with the process of the present invention. An aluminum lactate complex solution was prepared by adding 160.1 grams of aluminum nitrate ($Al(NO_3)_3.9H_2O$), 148.5 grams of 90 percent by weight lactic acid, and 112.3 grams of ammonium hydroxide to 3200.6 grams of deionized water. The pH of the ion exchange solution was 6.05. Approximately 674.5 grams of the ammonium exchanged commercial fluid catalytic cracking catalyst from Example 19 was added to the solution which then had a final pH of 6.29. The ion exchange was performed for about 5 hours at a temperature of from about 90° C. to about 100° C. The aluminum exchanged commercial catalyst was filtered from the exchange solution, washed with about 2 liters of deionized water, and filter dried for about 16 hours.

A second aluminum ion exchange was performed with the one aluminum ion exchanged catalyst by preparing a second ion exchange solution comprising 80.1 grams of ($Al(NO_3)_3.9H_2O$), 74.5 grams of 90 percent by weight lactic acid, and 56.9 grams of ammonium hydroxide in 1600.1 grams of deionized water. The pH of the ion exchange solution was 6.05. Approximately 323.6 grams of the singularly exchanged commercial catalyst was added to the solution which then had a final pH of 6.29. An additional 1.7 grams of concentrated nitric acid was added to the solution of adjust the pH to 5.99. The ion exchange was performed for about 5 hours at a temperature of from about 90° C. to about 100° C. The aluminum exchanged commercial catalyst was filtered from the exchange solution, washed with about 0.2 liters of deionized water, and program calcined in accordance with the calcination program described in Example 1.

The twice aluminum exchanged commercial fluid catalytic cracking catalyst was steamed by loading approximately 200.0 grams of the calcined commercial catalyst into a 1.25 inch ID quartz tube. The catalyst was steamed at about 816° C. for a period of about 5 hours with substantially pure steam having a water flow of about 60 ml per hour. The twice aluminum exchanged and steamed commercial fluid catalytic cracking catalyst was designated as Catalyst B4.

EXAMPLE 21

Approximately 230 grams of the calcined fluid catalytic cracking catalyst of Example 19 was steamed for comparison with the twice aluminum exchanged and steamed catalyst of Example 20. Steaming was performed in a manner consistent with the method described above in Example 2. The steamed only commercial fluid catalytic cracking catalyst was designated as Catalyst B4 Base.

EXAMPLE 22

The catalytic activity of Catalysts B4 and B4 Base from Examples 20 and 21 respectively, were determined in a microactivity test unit similar to that described in ASTM Test Method D 3907-87. Two runs were made for each of the respective catalysts. The feedstock was the same as that described in Example 4 and Table 1.

The microactivity test for both B4 and B4 Base were performed at substantially constant catalyst to oil ratios. Selected product yields, with a particular focus on $C_4$ and $C_5$ olefinic hydrocarbons suitable for use in subsequent etherification and alkylation processes, were determined by weight. The results of these tests are described in Table 4.

The commercial fluid catalytic cracking catalyst processed in accordance with the present invention, Example 20, produced a higher yield of total $C_4$ and $C_5$ olefinic hydrocarbons than the base case of Example 21. The yield of $C_4$ and $C_5$ iso-olefins remained substantially higher for the B4 catalyst than for the B4 Base case.

TABLE 4

| | A2 Base RUN 1 | B2 Base RUN 2 | B2 RUN 1 | B2 RUN 2 | B3 Base RUN 1 | B3 Base RUN 2 | B3 Base RUN 3 | B3 RUN 1 | B3 RUN 2 | B3 RUN 3 | B4 Base RUN 1 | B4 Base RUN 2 | B4 RUN 1 | B4 RUN 2 |
|---|---|---|---|---|---|---|---|---|---|---|---|---|---|---|
| PROCESS CONDITIONS | | | | | | | | | | | | | | |
| Reaction Temperature, °F. | 949 | 950 | 950 | 950 | 976 | 975 | 971 | 971 | 975 | 969 | 972 | 973 | 972 | 974 |
| Catalyst To Oil Ratio | 9.29 | 9.60 | 9.59 | 9.39 | 3.09 | 3.19 | 3.11 | 3.22 | 3.15 | 3.12 | 3.13 | 3.02 | 3.13 | 3.11 |
| WHSV, hr$^{-1}$ | 42.00 | 41.00 | 42.00 | 43.00 | 23.30 | 22.56 | 23.12 | 22.38 | 22.83 | 23.06 | 23.00 | 23.82 | 23.02 | 23.12 |
| PRODUCT YIELDS | | | | | | | | | | | | | | |
| Conversion, Wt. % | 72.31 | 72.58 | 72.40 | 72.28 | 64.70 | 68.30 | 64.70 | 67.80 | 68.50 | 66.30 | 63.50 | 60.40 | 64.50 | 67.8 |
| Weight Balance, Wt. % | 99.41 | 99.35 | 99.27 | 99.09 | 96.10 | 93.50 | 95.90 | 92.30 | 94.60 | 95.60 | 96.10 | 98.60 | 96.20 | 96.90 |
| Normalized Yields, Wt. % | | | | | | | | | | | | | | |
| $H_2$—$C_3$ | 6.77 | 6.79 | 7.55 | 7.47 | | | | | | | | | | |
| $C_3^=$ | 7.80 | 7.45 | 7.66 | 7.66 | 3.74 | 4.00 | 3.59 | 3.82 | 3.98 | 3.84 | 3.36 | 3.18 | 3.61 | 3.59 |
| $NC_4^=$ | 1.69 | 1.64 | 1.94 | 1.99 | 3.67 | 3.88 | 3.66 | 3.82 | 3.96 | 3.73 | 3.48 | 3.30 | 3.63 | 3.77 |
| $IC_4^=$ | 5.49 | 5.49 | 4.83 | 4.78 | 1.43 | 1.54 | 1.40 | 1.55 | 1.60 | 1.52 | 1.38 | 1.32 | 1.48 | 1.51 |
| $NC_5^=$ | 2.91 | 2.90 | 3.32 | 3.25 | 1.91 | 2.01 | 1.88 | 1.96 | 2.02 | 1.85 | 1.86 | 1.74 | 1.83 | 1.96 |
| $IC_5^=$ | 17.89 | 17.48 | 17.75 | 17.68 | 2.62 | 2.76 | 2.55 | 2.84 | 2.92 | 2.69 | 2.53 | 2.37 | 2.65 | 2.83 |
| TOTAL $C_4^= + C_5^=$ | 4.60 | 4.54 | 5.26 | 5.24 | 9.63 | 10.19 | 9.49 | 10.17 | 10.50 | 9.79 | 9.25 | 8.73 | 9.59 | 10.07 |
| TOTAL $IC_4^= + IC_5^=$ | 46.99 | 47.54 | 45.33 | 45.33 | 4.05 | 4.30 | 3.95 | 4.39 | 4.52 | 4.21 | 3.91 | 3.69 | 4.13 | 4.34 |
| $C_5$-430° F. | 5.57 | 5.71 | 6.46 | 6.42 | 45.43 | 47.86 | 45.67 | 47.42 | 46.86 | 44.89 | 45.35 | 42.98 | 43.62 | 46.70 |
| COKE | | | | | 3.15 | 3.50 | 3.24 | 4.34 | 4.26 | 4.58 | 3.31 | 3.35 | 4.86 | 4.91 |
| $H_2/CH_4$ Ratio | | | | | 0.95 | 0.97 | 1.16 | 1.39 | 1.27 | 1.52 | 1.07 | 1.22 | 1.63 | 1.61 |
| $C_5$-430° F. – RON CLEAR | 90.60 | 90.60 | 92.20 | 92.50 | | | | | | | | | | |
| $C_5$-430° F. – MON CLEAR | 80.40 | 80.70 | 81.40 | 80.90 | | | | | | | | | | |

EXAMPLE 23

Examples 23 through 31 illustrate the benefits of processing fluid catalytic cracking additives comprising pentasils such as ZSM-5 or borosilicate-containing additives in combination with conventional fluid catalytic cracking catalysts that may or may not have been processed in accordance with the present invention.

Approximately 690.2 grams of a commercially available fluid catalytic cracking catalyst additive comprising ZSM-5, produced by manufacturer C, was ammonium exchanged with 613.5 grams of ammonium acetate in about 5 liters of deionized water. The ammonium exchange was conducted for a period of 5 hours at a temperature ranging from about 90° C. to about 100° C. The ammonium exchanged commercial catalyst additive was filtered from the exchange solution, washed with about 2 liters of deionized water, and filter dried for about 16 hours.

EXAMPLE 24

The ammonium exchanged commercial fluid catalytic cracking catalyst additive of Example 23 was processed in accordance with the present invention. An aluminum lactate complex solution was prepared by adding 120.4 grams of aluminum nitrate $(Al(NO_3)_3.9 H_2O)$, 111.7 grams of 90 percent by weight lactic acid, 89.9 grams of concentrated ammonium hydroxide, and 7.9 grams of concentrated nitric acid to 2400.0 grams of deionized water. The pH of the ion exchange solution was 5.97. Approximately 332.8 grams of the ammonium exchanged commercial fluid catalytic cracking catalyst additive from Example 23 was added to the solution which then had a final pH of 6.29. The ion exchange was performed for about 5 hours at a temperature of from about 90° C. to about 100° C. The aluminum exchanged commercial catalyst was filtered from the exchange solution, washed with about 2 liters of deionized water, and filter dried for about 16 hours.

A second aluminum ion exchange was performed with the once aluminum ion exchanged catalyst additive by preparing a second ion exchange solution comprising 120.0 grams of aluminum nitrate $(Al(NO_3)_3.9 H_2O)$, 111.9 grams of 90 percent by weight lactic acid, 91.2 grams of concentrated ammonium hydroxide, and 4.8 grams of concentrated nitric acid in 2400.1 grams of deionized water. The pH of the ion exchange solution was 5.93. Approximately 337.7 grams of the singularly exchanged commercial catalyst additive was added to the solution which then had a final pH of 6.09. The ion exchange was performed for about 5 hours at a temperature of from about 90° C. to about 100° C. The aluminum exchanged commercial catalyst additive was filtered from the exchange solution, washed with about 0.2 liters of deionized water, and program calcined in accordance with the calcination program described in Example 1.

The twice aluminum exchanged commercial fluid catalytic cracking catalyst additive was steamed by loading approximately 200.0 grams of the calcined commercial catalyst additive into a 1.25 inch ID quartz tube. The catalyst was steamed at about 816° C. for a period of about 5 hours with substantially pure steam having a water flow of about 60 ml per hour. The twice aluminum exchanged and steamed commercial fluid catalytic cracking catalyst additive was designated as Catalyst C1.

EXAMPLE 25

Approximately 200.0 grams of the ammonium exchanged fluid catalytic cracking catalyst additive comprising ZSM-5 of Example 23 was steamed for comparison with various embodiments of the twice aluminum exchanged and steamed catalyst of Example 24. Steaming was performed in a manner consistent with the method described in Example 2. The steamed-only commercial fluid catalytic cracking catalyst additive was designated as Catalyst C1 Base.

EXAMPLE 26

The catalytic activity of steamed Catalyst B1 Base from Example 7 was retested in a microactivity test unit similar to that described in ASTM Test Method D3907-87. The feedstock was the same as that described in Example 4 and Table 1. The microactivity test was performed at an average run temperature of 975° F. and at a catalyst to oil ratio of 3.11. Two runs were made for the catalyst and the average of the results obtained. The results of this test are presented in Table 5.

EXAMPLE 27

The catalytic activity of a mixture of 2.7 grams of steamed Catalyst B1 Base from Example 7 and 0.3 grams of the steamed catalyst, C1 Base, from Example 25 was tested in a microactivity test unit similar to that described in ASTM Test Method D3907-87. The feedstock, process variables, and testing procedures were similar to those of Example 26. The results of this test are presented in Table 5.

Adding a steamed catalyst additive comprising ZSM-5 to a steamed conventional fluid catalytic cracking catalyst resulted in a substantial increase in isobutylene, isoamylene, and propylene yields and reduced gasoline yield and overall conversion compared to Example 26 wherein a catalyst comprising 100 percent of a steamed conventional fluid catalytic cracking catalyst was utilized. The research and motor octane of the gasoline fraction were also increased.

EXAMPLE 28

The catalytic activity of a mixture of 2.7 grams of steamed Catalyst B1 Base from Example 7 and 0.3 grams of aluminum exchanged and steamed commercial fluid catalytic cracking catalyst additive, C1, from Example 24 was tested in a microactivity test unit similar to that described in ASTM Test Method D3907-87. The feedstock, process variables, and testing procedures were similar to those of Example 26. The results of this test are presented in Table 5.

Adding a catalyst additive comprising ZSM-5, treated in accordance with the present invention, to a steamed conventional fluid catalytic cracking catalyst, resulted in increased propylene, isobutylene, and isoamylene yields and reduced gasoline yield and overall conversion compared to Example 26 wherein a catalyst comprising 100 percent of a steamed conventional fluid catalytic cracking catalyst was utilized. Examples 26, 27, and 28 generally illustrate that adding a ZSM-5 containing catalyst additive to a steamed conventional fluid catalytic cracking catalyst generally increases overall olefin yields at the expense of conversion and gasoline yield. The research and motor octane of the gasoline fraction is also generally increased.

EXAMPLE 29

The catalytic activity of a mixture of 2.7 grams of aluminum modified Catalyst B1 from Example 6 and 0.3 grams of the steamed catalyst, C1 Base, from Example 25 was tested in a microactivity test unit similar to that described in ASTM Test Method D3907-87. The feedstock, process variables, and testing procedures were similar to those of Example 26. The results of this test are presented in Table 5.

Modifying a conventional fluid catalytic cracking catalyst in accordance with the present invention and combining the catalyst with a steamed catalyst comprising ZSM-5 resulted in increased light gas make, propylene, and overall gasoline yields, and lower isobutylene and isoamylene yields compared to Example 27 wherein an unmodified conventional fluid catalytic cracking catalyst was combined with an unmodified steamed catalyst comprising ZSM-5. The research and motor octane of the gasoline fraction was similar for both cases.

EXAMPLE 30

The catalytic activity of a mixture of 2.7 grams of aluminum modified Catalyst B1 from Example 6 and 0.3 grams of aluminum exchanged commercial fluid catalytic cracking catalyst additive, C1, from Example 24 was tested in a microactivity test unit similar to that described in ASTM Test Method D3907-87. The feedstock, process variables, and testing procedures were similar to those of Example 26. The results of this test are presented in Table 5.

Combining a modified conventional fluid catalytic cracking catalyst and a modified catalyst comprising ZSM-5 in accordance with the present invention provides a synergistic improvement in total isobutylene plus isoamylene yield and in overall gasoline yield compared to a comparison of the yields derived from Examples 28 and 29 wherein only one or the other of the catalyst components was modified in accordance with the present invention. For example, wherein total isobutylene and isoamylene yield would be projected as generally approaching the midpoint of 4.5 weight percent (Example 28) and 5.97 weight percent (Example 29), the yield was substantially beyond midpoint at 5.67 weight percent. Similarly, wherein gasoline boiling range yield would be projected as generally approaching the midpoint of 36.85 weight percent (Example 28) and 30.41 weight percent (Example 29), the yield was substantially beyond midpoint, and in fact exceeded the yield range at 38.29 weight percent. Therefore, catalyst compositions comprising multiple components that have been modified in accordance with the present invention can provide reduced propylene yield per yield of isobutylene and isoamylene while providing increased yields of gasoline boiling hydrocarbon.

EXAMPLE 31

The catalytic activity of a mixture of 2.7 grams of aluminum modified Catalyst B1 from Example 6, 0.15 grams of the steamed Catalyst C1 Base from Example 25, and 0.15 grams of aluminum exchanged commercial fluid catalytic cracking catalyst additive C1 from Example 24 was tested in a microactivity test unit similar to that described in ASTM Test Method D3907-87. The feedstock, process variables, and testing procedures were similar to those of Example 26. The results of this test are presented in Table 5.

Combining an aluminum modified conventional catalytic cracking catalyst with a mixture of an aluminum exchanged and unmodified catalyst comprising ZSM-5, resulted in a synergistic increase in propylene yield and a synergistic reduction in gasoline yield. For example, wherein propylene yield would be projected as generally approaching the midpoint of 8.39 weight percent (Example 29) and 5.59 weight percent (Example 30), the yield was substantially beyond midpoint, and in fact exceed the yield range at 8.60 weight percent. Similarly, wherein gasoline boiling range yield would be projected as generally approaching the midpoint of 30.41 weight percent (Example 29) and 38.29 weight percent (Example 30), the yield was substantially below midpoint at 31.54 weight percent. Therefore, the introduction of components that have not been modified in accordance with the present invention can result in a substantial increase in propylene yield relative to isobutylene and isoamylene yields and a substantial reduction in gasoline yield.

TABLE 5

| | CATALYST | | | | | |
|---|---|---|---|---|---|---|
| | 100% B1 Base | 90% B1 Base 10% C1 Base | 90% B1 Base 10% C1 | 90% B1 10% C1 Base | 90% B1 10% C1 | 90% B1 5% C1 5% C1 Base |
| PROCESS CONDITIONS | | | | | | |
| Reaction Temperature, °F. | 975 | 974 | 973 | 976 | 972 | 975 |
| Catalyst To Oil Ratio | 23.2 | 23.6 | 23.6 | 22.7 | 23.2 | 23.0 |
| WHSV, hr$^{-1}$ | | | | | | |
| PRODUCT YIELDS | | | | | | |
| Conversion, Wt. % | 56.5 | 55.1 | 55.6 | 61.4 | 62.7 | 61.8 |
| Weight Balance, Wt. % | 95.8 | 97.3 | 98.3 | 94.5 | 95.8 | 95.9 |
| Normalized Yields, Wt. | | | | | | |
| $H_2$—$C_2$ | 1.94 | 2.43 | 1.78 | 3.28 | 2.20 | 2.69 |
| $TC_3$ | 3.90 | 9.55 | 4.80 | 9.80 | 6.47 | 9.90 |
| $C_3^=$ | 3.27 | 8.24 | 4.17 | 8.39 | 5.59 | 8.60 |
| $TC_4$ | 7.28 | 11.05 | 8.21 | 11.92 | 9.98 | 11.82 |
| $IC_4^=$ | 1.25 | 6.85 | 1.64 | 3.00 | 2.20 | 2.71 |
| $TC_5$ | 7.18 | 7.25 | 7.88 | 7.83 | 8.95 | 8.28 |
| $IC_5^=$ | 2.28 | 2.70 | 2.86 | 2.97 | 3.47 | 3.18 |
| TOTAL $IC_4^=$ + $IC_5^=$ | 3.53 | 9.55 | 4.50 | 5.97 | 5.67 | 5.89 |
| $C_5$-430° F.$^-$ | 39.19 | 27.82 | 36.85 | 30.41 | 38.29 | 31.54 |
| COKE | 3.07 | 3.05 | 2.81 | 4.83 | 4.51 | 4.58 |
| $C_5$-430° F.$^-$ RON CLEAR | 93.3 | 96.1 | 93.9 | 95.5 | 94.5 | 95.6 |
| $C_5$-430° F.$^-$ MON CLEAR | 81.4 | 83.4 | 81.9 | 83.4 | 82.2 | 83.1 |

Other embodiments of the invention will be apparent to those skilled in the art from a consideration of this specification or from practice of the invention disclosed herein. It is intended that this specification be considered as exemplary only with the true scope and spirit of the invention being indicated by the following claims.

That which is claimed is:

1. A process for the catalytic cracking of a hydrocarbon feedstock to catalytic cracking conversion products comprising the steps of contacting said hydrocarbon feedstock at catalytic cracking conditions with a catalytic cracking catalyst, said catalytic cracking catalyst being prepared by a method comprising the steps of modifying a base catalyst comprising a crystalline molecular sieve and a binder by combining said base catalyst with an ion exchange solution comprising at least one trivalent cation, a trivalent cation complexing agent, and a hydroxide-producing component, wherein said ion exchange solution has a pH ranging from about 4 to about 8, and producing an ion exchanged catalyst and excess ion exchange solution; and separating said modified catalyst from said excess ion exchange solution.

2. The catalytic cracking process of claim 1 wherein said base catalyst is a commercial FCC catalyst comprising a crystalline molecular sieve selected from the group consisting of the zeolites, borosilicate, and gallosilicate.

3. The catalytic cracking process of claim 1 wherein said base catalyst comprises a first FCC catalyst comprising a molecular sieve selected from the group consisting of faujasite, zeolite Y, US-Y, and beta zeolite and a second FCC catalyst comprising a molecular sieve selected from the group consisting of ZSM-5 and borosilicate, wherein both said first and said second FCC catalysts are modified together or separately in said modifying step.

4. The catalytic cracking process of claim 1 wherein said trivalent cation is at least one member selected from the group consisting of aluminum, gallium, iron (III), chromium (III), and the rare earth metals.

5. The method of claim 1 wherein said trivalent cation complexing agent has a complexing stability constant ranging from about 2 to about 15.

6. The catalytic cracking process of claim 1 wherein said trivalent cation complexing agent is at least one member selected from the group consisting of 2-hydroxypropionic acid, 2-hydroyacetic acid, 2-hydroxybutanoic acid, 2-hydroxypentanoic acid, 3-hydroxybutanoic acid, and 3-hydroxypentanoic acid.

7. The catalytic cracking process of claim 1 wherein said trivalent cation is aluminum and said trivalent cation complexing agent is 2-hydroxypropionic acid.

8. The catalytic cracking process of claim 1 wherein said hydroxide-producing component is at least one member selected from the group consisting of ammonium hydroxide, tetraalkylammonium hydroxide, and the Group I hydroxides and said hydroxide-producing component is added to said ion exchange solution in an amount and concentration for providing an ion exchange solution pH in the range of from about 4.5 to about 7.0.

9. The catalytic cracking process of claim 1 wherein said catalytic cracking conversion products comprise olefinic hydrocarbons having 4 and 5 carbon atoms and the yield of said olefinic hydrocarbons having 4 and 5 carbon atoms is increased by at least 10 percent, compared to the yield from a catalytic cracking process using a catalytic cracking catalyst that is not ion exchanged.

10. The catalytic cracking process of claim 1 wherein a steaming step after said separating step and said steaming step is performed at a temperature ranging from about 1000° F. to about 1550° F. and at a pressure ranging from about 0.9 atm to about 6 atm.

11. A catalytic cracking catalyst comprising a crystalline molecular sieve and a binder wherein said catalyst has been modified by nondestructive trivalent cation ion exchange comprising the steps of modifying a base catalyst comprising a crystalline molecular sieve and a binder by combining said base catalyst with an ion exchange solution comprising at least one trivalent cation, a trivalent cation complexing agent, and a hydroxide-producing component, wherein said ion exchange solution has a pH ranging from about 4 to about 8, and producing an ion exchanged catalyst and excess ion exchange solution; and separating said modified catalyst from said excess ion exchange solution.

12. The catalytic cracking catalyst of claim 11 wherein said base catalyst comprises a crystalline molecular sieve selected from the group consisting of the zeolites, borosilicate, and gallosilicate.

13. The catalytic cracking catalyst of claim 11 wherein said base catalyst comprises a first FCC catalyst comprising a molecular sieve selected from the group consisting of faujasite, zeolite Y, US-Y, and beta zeolite and a second FCC catalyst comprising a molecular sieve selected from the group consisting of ZSM-5 and borosilicate, wherein both said first and said second FCC catalysts are modified together or separately in said modifying step.

14. The catalytic cracking catalyst of claim 11 wherein said trivalent cation is at least one member selected from the group consisting of aluminum, gallium, iron (III), chromium (III), and the rare earth metals.

15. The catalytic cracking catalyst of claim 11 wherein said trivalent cation is aluminum.

16. The catalytic cracking catalyst of claim 11 wherein said trivalent cation complexing agent is at least one member selected from the group consisting of 2-hydroxypropionic acid, 2-hydroxyacetic acid, 2-hydroxybutanoic acid, 2-hydroxypentanoic acid, 3-hydroxybutanoic acid, and 3-hydroxypentanoic acid.

17. The catalytic cracking catalyst of claim 11 wherein said trivalent cation complexing agent is 2-hydroxypropionic acid.

18. The catalytic cracking catalyst of claim 11 wherein said hydroxide-producing component is at least one member selected from the group consisting of ammonium hydroxide and the Group I hydroxides.

19. The catalytic cracking catalyst of claim 18 wherein said hydroxide-producing component is added to said ion exchange solution in an amount and concentration for providing an ion exchange solution pH in the range of from about 4.5 to about 7.0.

20. The catalytic cracking catalyst of claim 11 wherein a steaming step after said separating step and said steaming step is performed at a temperature ranging from about 1000° F. to about 1550° F. and at a pressure ranging from about 1.0 atm to about 4.0 atm.

* * * * *

UNITED STATES PATENT AND TRADEMARK OFFICE
CERTIFICATE OF CORRECTION

PATENT NO. : 5,294,332
DATED : March 15, 1994
INVENTOR(S) : Marvin R. Klotz

It is certified that error appears in the above-indentified patent and that said Letters Patent is hereby corrected as shown below:

| Col. | Line |  |
|------|------|--|
| 30 | 6 | reads "the solution of adjust" should read --the solution to adjust-- |
| 35 | Tab 5 | reads "Catalyst to Oil Ratio   23.2 . . ." should read --Catalyst to Oil Ratio   3.11   3.06   3.05   3.17   3.10   3.12-- |

Signed and Sealed this

Twenty-third Day of August, 1994

Attest:

BRUCE LEHMAN

Attesting Officer

Commissioner of Patents and Trademarks